US012525359B2

(12) United States Patent
Rajan et al.

(10) Patent No.: US 12,525,359 B2
(45) Date of Patent: Jan. 13, 2026

(54) SYSTEMS AND METHODS FOR CLUSTERING PHYSIOLOGICAL EVENTS

(71) Applicant: Cardiac Pacemakers, Inc., St. Paul, MN (US)

(72) Inventors: Abhijit Rajan, Shoreview, MN (US); David L. Perschbacher, Blaine, MN (US); Deepa Mahajan, North Oaks, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 286 days.

(21) Appl. No.: 18/212,496

(22) Filed: Jun. 21, 2023

(65) Prior Publication Data
US 2024/0013924 A1  Jan. 11, 2024

Related U.S. Application Data

(60) Provisional application No. 63/359,333, filed on Jul. 8, 2022.

(51) Int. Cl.
*G16H 50/30* (2018.01)
*A61B 5/00* (2006.01)
(Continued)

(52) U.S. Cl.
CPC ........... *G16H 50/30* (2018.01); *A61B 5/7282* (2013.01); *A61B 5/742* (2013.01); *A61B 5/7475* (2013.01);
(Continued)

(58) Field of Classification Search
CPC ........ G16H 50/30; G16H 40/20; G16H 15/00; G16H 40/67; A61B 5/7282; A61B 5/742; A61B 5/7475
See application file for complete search history.

(56) References Cited

U.S. PATENT DOCUMENTS 7,941,208 B2 *  5/2011  Sauer .................... A61N 1/3622
                                                         600/509
9,533,165 B1 *  1/2017  Gunderson ............ A61B 5/686
(Continued)

FOREIGN PATENT DOCUMENTS

| CN | 119546369 A | 2/2025 |
| JP | 2025522902 A | 7/2025 |
| WO | WO-2024010690 A1 | 1/2024 |

OTHER PUBLICATIONS

"International Application Serial No. PCT/US2023/025844, International Preliminary Report on Patentability mailed Jan. 23, 2025", 9 pgs.
(Continued)

*Primary Examiner* — Michael I Ezewoko
(74) *Attorney, Agent, or Firm* — Nelson Mullins Riley & Scarborough LLP

(57) ABSTRACT

Systems and methods for managing physiological events generated by a medical device in a patient are discussed. An exemplary system includes a controller circuit to receive information about a plurality of physiological events detected by a medical device in a patient, generate for each of the physiological events a respective feature set using the received information, and cluster the physiological events into different event groups using values of temporal or morphological features of the generated feature sets. The event groups each include a respective set of physiological events. The controller circuit can identify from at least one event group a representative event representing the physiological events of that event group, and output to a user or a process the representative event and an indication that the representative event has been determined and represents the set of physiological events in the even group.

18 Claims, 8 Drawing Sheets

(51) Int. Cl.
*G16H 15/00* (2018.01)
*G16H 40/20* (2018.01)
*G16H 40/67* (2018.01)

(52) U.S. Cl.
CPC ............. *G16H 15/00* (2018.01); *G16H 40/20* (2018.01); *G16H 40/67* (2018.01)

(56) References Cited

U.S. PATENT DOCUMENTS

| | | | |
|---|---|---|---|
| 10,123,741 B2* | 11/2018 | Wang | A61N 1/3987 |
| 10,368,769 B2* | 8/2019 | Cao | A61B 5/746 |
| 10,548,535 B2* | 2/2020 | Zhang | A61B 5/0205 |
| 11,089,958 B2* | 8/2021 | Brisben | A61B 5/363 |
| 11,806,543 B2* | 11/2023 | Mahajan | A61N 1/3956 |
| 11,980,472 B2* | 5/2024 | Gill | A61B 5/0205 |
| 12,033,753 B2* | 7/2024 | Ghosh | G16H 40/67 |
| 12,123,654 B2* | 10/2024 | Poltorak | F28F 13/12 |
| 12,213,792 B2* | 2/2025 | Perschbacher | A61B 5/0006 |
| 12,251,201 B2* | 3/2025 | Poltorak | A61B 5/0022 |
| 2005/0256413 A1 | 11/2005 | Astrom et al. | |
| 2008/0125824 A1* | 5/2008 | Sauer | A61N 1/3622 600/518 |
| 2011/0112597 A1* | 5/2011 | Snell | A61N 1/37235 607/27 |
| 2014/0228714 A1 | 8/2014 | Chau et al. | |
| 2014/0236026 A1* | 8/2014 | Zhang | G16H 40/63 600/587 |
| 2014/0236029 A1* | 8/2014 | Averina | A61B 5/349 600/508 |
| 2015/0342466 A1* | 12/2015 | Thakur | A61B 5/361 600/528 |
| 2017/0027462 A1* | 2/2017 | Mahajan | A61B 5/333 |
| 2017/0231505 A1* | 8/2017 | Mahajan | A61B 5/352 600/484 |
| 2017/0290550 A1* | 10/2017 | Perschbacher | A61B 5/076 |
| 2018/0028086 A1* | 2/2018 | Cao | A61N 1/3624 |
| 2018/0310892 A1* | 11/2018 | Perschbacher | A61N 1/37258 |
| 2018/0315285 A1* | 11/2018 | Janssen | A61B 5/746 |
| 2019/0008384 A1* | 1/2019 | Brisben | A61B 5/364 |
| 2019/0231207 A1* | 8/2019 | Perschbacher | G16H 15/00 |
| 2019/0232067 A1* | 8/2019 | Mahajan | A61B 5/361 |
| 2020/0016420 A1* | 1/2020 | Mahajan | A61B 5/316 |
| 2020/0357493 A1* | 11/2020 | Kelly | G16H 10/60 |
| 2021/0045640 A1* | 2/2021 | Poltorak | A61B 5/369 |
| 2022/0280095 A1* | 9/2022 | Perschbacher | A61B 5/0006 |
| 2024/0017081 A1* | 1/2024 | Mahajan | A61B 5/363 |

OTHER PUBLICATIONS

"International Application Serial No. PCT/US2023/025844, International Search Report mailed Sep. 29, 2023", 4 pgs.
"International Application Serial No. PCT/US2023/025844, Written Opinion mailed Sep. 29, 2023", 7 pgs.
"Japanese Application Serial No. 2025-500250, Voluntary Amendment filed Jan. 17, 2025", w/ English claims, 7 pgs.

* cited by examiner

SYSTEMS AND METHODS FOR CLUSTERING PHYSIOLOGICAL EVENTS

CLAIM OF PRIORITY

This application claims the benefit of U.S. Provisional Patent Application Ser. No. 63/359,333, filed on Jul. 8, 2022, which is hereby incorporated by reference in its entirety.

TECHNICAL FIELD

This document relates generally to patient management systems, and more particularly, to systems, devices, and methods for automatically clustering physiological events of a patient to facilitate event review and adjudication by a clinician.

BACKGROUND

Implantable medical devices (IMDs) have been used for monitoring patient health condition or disease states and delivering therapies. For example, implantable cardioverter-defibrillators (ICDs) may be used to monitor for certain abnormal heart rhythms (or cardiac arrhythmias) and to deliver electrical energy to the heart to correct the abnormal rhythms. One of the most common cardiac arrhythmias is atrial fibrillation (AF), where disorganized electrical pulses originated from regions in or near an atrium irregularly conduct to ventricles, and cause inappropriately fast and irregular heart rate. AF may be paroxysmal that may last from minutes to days before it stops by itself. Persistent AF may last for over a week and typically requires medication or other treatment to revert to normal sinus rhythm. AF is permanent if a normal heart rhythm cannot be restored with treatment. Some IMDs may be used to monitor for chronic heart conditions, such as worsening of heart failure (WHF) that may be characterized by cardiac dyssynchrony within a ventricle or between ventricles. An IMD can provide cardiac stimulation therapies, such as cardiac resynchronization therapy (CRT) to correct cardiac dyssynchrony.

Some IMDs may, upon a detection of a particular medical event such as a cardiac arrhythmia event, a WHF event, or other physiological events, record physiological data of an event episode and generate patient alert notification. Some IMDs may register a patient-triggered episode of a medical event, and record physiological data in response to the patient trigger. The recorded physiological data and the alert notification may be provided to a healthcare professional to signal the patient health condition. With the notification, the healthcare provider may choose to review the recorded physiological data associated with the event episode, adjudicate the device-detected physiological events (e.g., determine the presence, or possible causes, of the physiological event), or assess whether a therapy has resulted in a desired therapeutic outcome.

A patient management system may monitor patients with IMDs that are interconnected to the patient management via a data communication network. Such a patient management system may allow a healthcare provider to follow up with the patients remotely, or to assess device functions on a periodic basis.

Overview

A patient management system may store and manage a large volume of alert notifications corresponding to physiological events detected and reported by ambulatory medical devices (AMDs). For example, in managing a cohort of AMD patients in a clinic, the patient management system may frequently receive alert notifications on various cardiac arrhythmia episodes or worsening heart failure (WHF) events detected by the implantable cardiac devices, such as a cardiac monitor, a pacemaker, an implantable defibrillator, or a cardiac resynchronization therapy device. Some AMDs may register patient-triggered episodes such as when the patient demonstrates certain signs or symptoms, or experiences a precursor event indicative of a medical event (e.g., cardiac arrhythmia, syncope, or WHF events). Physiologic data associated with the device-detected physiological events or patient-triggered episodes may be transmitted to a patient management system, and reviewed by a clinician for the purpose of, for example, adjudicating the device-detected physiological events, scheduling patient follow-up visits, or reprogramming the AMDs, among others.

With a large number of AMDs connected to the patient management system, reviewing the device-detected physiological events (e.g., cardiac arrhythmia episodes) may take significant amount of time and clinical, technical, and human resources, which can be costly for a healthcare facility. Physiological events with the same or similar underlying causes (e.g., arrhythmia episodes of a particular type), when detected an AMD, may repeatedly trigger alert notifications. For example, a patient with a history of atrial fibrillation (AF) may experience frequent AF episodes detected by an implantable medical device, either appropriately detected (i.e., true positive, or TP, detections) or inappropriately detected (i.e., false positive, or FP, detections). The TP detections of superfluous AF episodes may reflect highly recurrent AF events, or caused by the device being overly sensitive to noise or temporary stabilization of heart rate during an underlying long and sustained AF episode. Repeated FP detections of AF episodes may be attributed to premature ventricular contractions (PVCs), premature atrial contractions (PACs), or atrioventricular conduction abnormality such as Wenckebach atrioventricular block, among other causes.

Superfluous event episodes and repeated alert notifications (of either TP detections or FP detections) increase clinician workload and healthcare cost. For example, as the event episodes may routinely be reviewed by a clinician or other human experts, superfluous event episodes increase human burden of reviewing and/or adjudicating such episodes. In addition, storing such a large volume of device-detected physiological events (e.g., sensor data and episode summaries) can take up a significant amount of device computational and storage resources.

Embodiments of systems, devices, and methods discussed in this document can advantageously identify and cluster physiological events with similar properties, and improve the functionality of a physiological event management system, including prioritizing storage, display (e.g., for user review and adjudication), or transmission of physiological events data between devices (e.g., from an implantable device to an external device). An exemplary system includes a controller circuit to receive information about a plurality of physiological events detected by a medical device in a patient, generate for each of the plurality of physiological events a respective feature set, and cluster the physiological events into different event groups using values of temporal or morphological features of the feature sets. The event groups each include a respective set of physiological events. The controller circuit can determine from at least one event group a representative event representing the physiological events of that event group. The representative event, and an indication that the representative event has been determined and represents the set of physiological events in the event group, can be provided to a user or a process. The representative event can be automatically displayed and get adjudicated by a user, while other physiological events in the same event group can be hidden from displaying and assigned by default with the same adjudication as the representative event, unless requested by a user and only get displayed and/or adjudicated on demand.

Example 1 is a system for managing a plurality of physiological events detected by a medical device in a patient, the system comprising: a controller circuit, configured to: receive information about the plurality of physiological events; for each of the plurality of physiological events, generate a respective feature set using the received information, the feature set including temporal or morphological features with respective values; cluster the plurality of physiological events into different event groups using the values of the temporal or morphological features of the generated feature sets, the different event groups each including a respective set of physiological events; determine, from at least one of the different event groups, a representative event representing the set of physiological events in the at least one event group; and output to a user or a process of the system the representative event and an indication that the representative event has been determined and represents the set of physiological events in the at least one event group.

In Example 2, the subject matter of Example 1 optionally includes, wherein the controller circuit is configured to: initiate an automatic display of information about the determined representative event on a user interface; hide information about the set of physiological events of the at least one event group from displaying on the user interface; and initiate an on-demand display of information about one or more of the set of physiological events of the at least one event group responsive to a user command via the user interface.

In Example 3, the subject matter of Example 2 optionally includes, wherein the user command includes a user selection of a physiological event from the set of physiological events of the at least one event group, and wherein the controller circuit is configured to display information about the selected physiological event on the user interface in response to the user selection.

In Example 4, the subject matter of any one or more of Examples 2-3 optionally include a user interface configured to receive an adjudication of the representative event from a user, wherein the controller circuit is configured to assign the received adjudication of the representative event to each of the set of physiological events of the at least one event group.

In Example 5, the subject matter of any one or more of Examples 1-4 optionally include, wherein the controller circuit is configured to prioritize storage of information about the determined representative event over storage of information about the set of physiological events of the at least one event group in a storage device.

In Example 6, the subject matter of any one or more of Examples 1-5 optionally include, wherein the controller circuit is configured to prioritize transmission of information about the determined representative event over transmission of information about the set of physiological events of the at least one event group between different devices.

In Example 7, the subject matter of any one or more of Examples 1-6 optionally include, wherein the plurality of physiological events include cardiac arrhythmia episodes detected from the patient, and the generated respective feature set includes at least one of: a heart rate distribution feature; an arrhythmia duration; a morphology feature; or time of day the plurality of physiological events were detected.

In Example 8, the subject matter of any one or more of Examples 1-7 optionally include, wherein to determine the representative event, the controller circuit is configured to: determine a centroid of the set of physiological events of the at least one event group in a feature space using feature sets generated respectively from at least a portion of the set of physiological events; and determine the representative event of the at least one event group as a physiological event closest to the determined centroid.

In Example 9, the subject matter of any one or more of Examples 1-8 optionally include, wherein to cluster the plurality of physiological events, the controller circuit is configured to: initialize a cluster center using a feature set of one of the plurality of physiological events; iteratively update the cluster center using a central tendency of feature sets respectively generated from physiological events in an event group until a convergence criterion or an iteration stopping criterion is met; and assign a physiological event to a clustered event group based on a similarity metric between the physiological event and the iteratively updated cluster center.

In Example 10, the subject matter of Example 9 optionally includes, wherein the controller circuit is configured to: compute respective similarity metrics between the representative event and each of the set of physiological events of the at least one event group; select, from the set of physiological events of the at least one event group, a subset of events each having the respective similarity metrics falling below a similarity threshold; and output to a user or a process of the system an indication that the representative event represents the selected subset of events.

In Example 11, the subject matter of any one or more of Examples 1-10 optionally include, wherein the controller circuit is configured to: compute respective similarity metrics between each of the received plurality of physiological events and a user-specified physiological event using feature sets generated respectively from the received plurality of physiological events and the user-specified physiological event; determine the set of physiological events of the at least one event group with the respective similarity metrics exceeding a similarity threshold; and determine the user-specified physiological event as the representative event of the least one event group.

In Example 12, the subject matter of Example 11 optionally includes a user interface configured to: display the received plurality of physiological events in a graphical representation of a feature space; receive a user input to identify the user-specified physiological event; and display information of the user-specified physiological event and an indication that the representative event represents the set of physiological events in the at least one event group.

In Example 13, the subject matter of Example 12 optionally includes, wherein the user interface is configured to receive a user input of the similarity threshold or a user selection of a pre-determined cluster density.

In Example 14, the subject matter of any one or more of Examples 11-13 optionally include, wherein the controller circuit is configured to: generate an estimate of amount of workload reduction associated with assigning a user adjudication of the representative event to each of the set of physiological events of the at least one event group; and determine or adjust the similarity threshold based on the generated estimate of amount of workload reduction.

In Example 15, the subject matter of any one or more of Examples 11-14 optionally include, wherein the controller circuit is configured to: generate an estimate of error rate associated with assigning a user adjudication of the representative event to each of the set of physiological events of the at least one event group; and determine or adjust the similarity threshold based on the generated estimate of error rate.

Example 16 is a method for managing a plurality of physiological events detected by a medical device in a patient, the method comprising: receiving information about the plurality of physiological events; for each of the plurality of physiological events, generating a respective feature set using the received information; clustering the plurality of physiological events into different event groups using the generated feature sets of the plurality of physiological events, the different event groups each including a respective set of physiological events; determining, from at least one of the different event groups, a representative event representing the set of physiological events in the at least one event group; and outputting to a user or a process the representative event and an indication that the representative event has been determined and represents the set of physiological events in the at least one event group.

In Example 17, the subject matter of Example 16 optionally includes: initiating an automatic display of information about the determined representative event on a user interface; hiding information about the set of physiological events of the at least one event group from displaying on the user interface; and initiating an on-demand display of information about one or more of the set of physiological events of the at least one event group responsive to a user command via the user interface.

In Example 18, the subject matter of Example 17 optionally includes: receiving an adjudication of the representative event from a user via the user interface; and automatically assigning the received adjudication of the representative event to each of the set of physiological events of the at least one event group.

In Example 19, the subject matter of any one or more of Examples 16-18 optionally include prioritizing storage or transmission of information about the determined representative event over storage or transmission of information about the set of physiological events of the at least one event group.

In Example 20, the subject matter of any one or more of Examples 16-19 optionally include, wherein clustering the plurality of physiological events into different event groups includes: initializing a cluster center using a feature set of one of the plurality of physiological events; iteratively updating the cluster center using a central tendency of feature sets respectively generated from physiological events in an event group until a convergence criterion or an iteration stopping criterion is met; and assigning a physiological event to a clustered event group based on a similarity metric between the physiological event and the iteratively updated cluster center.

In Example 21, the subject matter of any one or more of Examples 16-20 optionally include, wherein clustering the plurality of physiological events into different event groups includes: computing respective similarity metrics between each of the received plurality of physiological events and a user-specified physiological event using feature sets generated respectively from the received plurality of physiological events and the user-specified physiological event; determining the set of physiological events of the at least one event group with the respective similarity metrics exceeding a similarity threshold; and identifying the user-specified physiological event as the representative event of the least one event group.

In Example 22, the subject matter of Example 21 optionally includes, via a user interface: displaying the received plurality of physiological events in a graphical representation of a feature space; receiving the user-specified physiological event, and a user input of the similarity threshold or a user selection of a pre-determined cluster density; and displaying information of the user-specified physiological event and an indication that the representative event represents the set of physiological events in the at least one event group.

In Example 23, the subject matter of any one or more of Examples 21-22 optionally include: generating an estimate of amount of workload reduction, or an estimate of error rate, associated with assigning a user adjudication of the representative event to each of the set of physiological events of the at least one event group; and determining or adjusting the similarity threshold based on the generated estimate of amount of workload reduction or the generated estimate of error rate.

The systems, devices, and methods discussed in this document can improve physiological events and alert management in a patient monitoring system. As previously discussed, one of the challenges in physiological events management is that clinicians usually need to attend to a large amount of superfluous physiological events or alert notifications, which can be timing-consuming and costly. The present document provides a technological solution to simplify the review and adjudication process by clustering the physiological events into groups, identifying a representative event in each event group, and prioritizing the physiological events in the same group for review and adjudication, such as automatically displaying only the representative event for adjudication, while hiding other events in the event group from displaying unless requested by a user (i.e., an on-demand presentation of events other than the representative event). Compared to conventional physiological events and alert management systems and methods, the cluster-based event review and adjudication as described herein in accordance with various embodiments can substantially reduce the number of events or alert notifications presented to the clinician at little to no additional cost or system complexity. Accordingly, the system and methods as described herein better align medical resources to serve those patients with critical medical conditions.

The cluster-based event review and adjudication as discussed in this document may also improve the functionality of a computer system for managing physiological events and alerts. The event clustering, presentation, and adjudication may be implemented in, and executed by, a communicator, a mobile monitor, a programmer, or a remote patient management system in communication with an AMD. As such, in some cases, improved physiological event and alert management may be achieved without modifying existing patient AMDs or physiological event detectors. Because only a reduced set of physiological events (e.g., the representative events in the clustered event groups) are presented for adjudication, complexity and operating cost of the patient management system can be reduced. Prioritized data storage, such as automatically storing only the representative event in an event group while having other events stored only upon user request (i.e., on-demand storage) can make more efficient use of memory space. In some embodiments, physiological event detection as implemented in an AMD can be updated based on user adjudication of physiological events. The updated detection can help reduce false positive or false negative detections, and fewer unnecessary device therapy, drugs, and procedures may be scheduled, prescribed, or provided, battery life and longevity of the AMD can be extended, and an overall system cost savings may be realized.

This Overview is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Disclosed herein are systems, devices, and methods for managing physiological events generated by a medical device in a patient. An exemplary system includes a controller circuit that can receive information about a plurality of physiological events detected by a medical device in a patient, generate for each of the plurality of physiological events a respective feature set using the received information, and cluster the physiological events into different event groups using values of temporal or morphological features of the generated feature sets. The clustered event groups each include a respective set of physiological events. The controller circuit can determine from at least one event group a representative event representing the set of physiological events of that event group, and output to a user or a process the representative event and an indication that the representative event has been determined and represents the set of physiological events in the at least one event even group. The representative event can be automatically displayed and get adjudicated by a user, while other physiological events in the same event group can be hidden from displaying and assigned by default with the same adjudication as the representative event, unless requested by a user and only get displayed and/or adjudicated on demand.

Although this document is focused on arrhythmia events management, it should be appreciated by one skilled in the art that this is by way of example and not by way of limitation. The systems, devices, and methods of physiological events and alerts management, in accordance with various examples described in this document, may be applicable to management of other physiological events. The method or techniques described in this document may be implemented in various ambulatory (e.g., implantable, wearable, or holdable) or stationary devices or medical systems.

Figure 1:
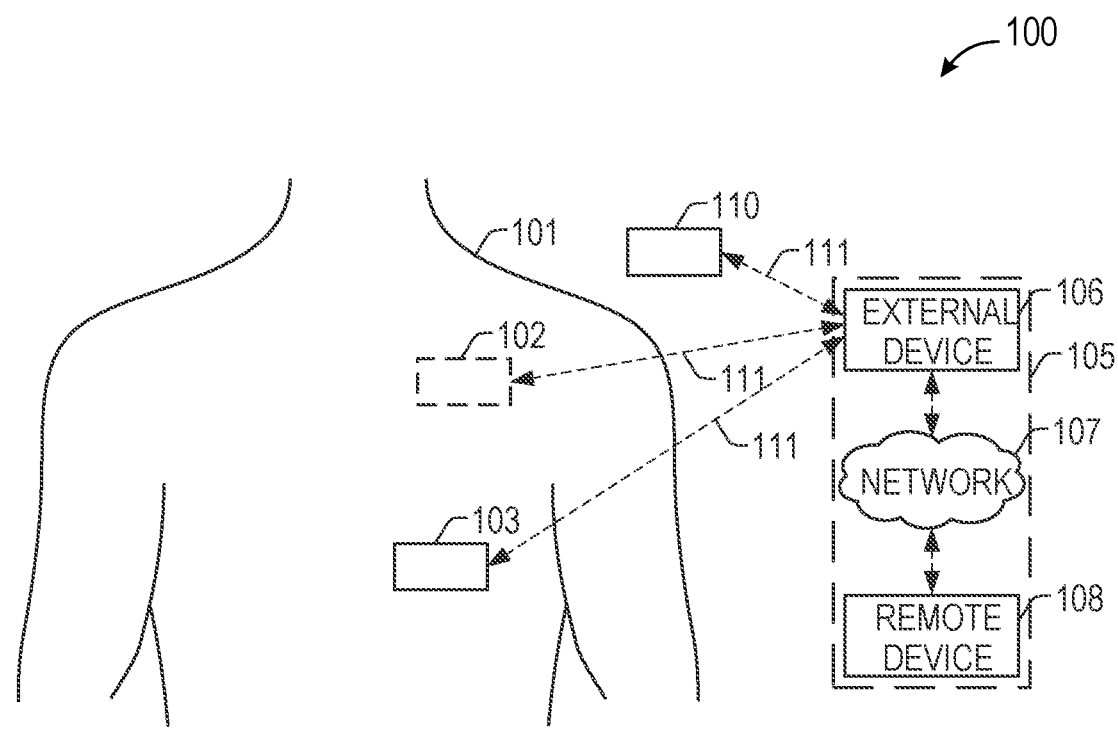
FIG. 1 illustrates generally an example of a patient management system and portions of an environment in which the system may operate.

FIG. 1 illustrates an example patient management system 100 and portions of an environment in which the patient management system 100 may operate. The patient management system 100 can perform a range of activities, including remote patient monitoring and diagnosis of a disease condition. Such activities can be performed proximal to a patient 101, such as in a patient home or office, through a centralized server, such as in a hospital, clinic, or physician office, or through a remote workstation, such as a secure wireless mobile computing device.

The patient management system 100 can include one or more ambulatory medical devices, an external system 105, and a communication link 111 providing for communication between the one or more ambulatory medical devices and the external system 105. The one or more ambulatory medical devices can include an implantable medical device (IMD) 102, a wearable medical device (WMD) 103, or one or more other implantable, leadless, subcutaneous, external, wearable, or ambulatory medical devices configured to monitor, sense, or detect information from, determine physiologic information about, or provide one or more therapies to treat various conditions of the patient 101, such as one or more cardiac or non-cardiac conditions (e.g., dehydration, sleep disordered breathing, etc.).

In an example, the IMD 102 can include one or more traditional cardiac rhythm management devices implanted in a chest of a patient, having a lead system including one or more transvenous, subcutaneous, or non-invasive leads or catheters to position one or more electrodes or other sensors (e.g., a heart sound sensor) in, on, or about a heart or one or more other position in a thorax, abdomen, or neck of the patient 101. In another example, the IMD 102 can include a monitor implanted, for example, subcutaneously in the chest of patient 101, the IMD 102 including a housing containing circuitry and, in certain examples, one or more sensors, such as a temperature sensor, etc.

The IMD 102 can include an assessment circuit configured to detect or determine specific physiologic information of the patient 101, or to determine one or more conditions or provide information or an alert to a user, such as the patient 101 (e.g., a patient), a clinician, or one or more other caregivers or processes. The IMD 102 can alternatively or additionally be configured as a therapeutic device configured to treat one or more medical conditions of the patient 101.

The therapy can be delivered to the patient 101 via the lead system and associated electrodes or using one or more other delivery mechanisms. The therapy can include delivery of one or more drugs to the patient 101, such as using the IMD 102 or one or more of the other ambulatory medical devices, etc. In some examples, therapy can include cardiac resynchronization therapy for rectifying dyssynchrony and improving cardiac function in heart failure patients. In other examples, the IMD 102 can include a drug delivery system, such as a drug infusion pump to deliver drugs to the patient for managing arrhythmias or complications from arrhythmias, hypertension, or one or more other physiologic conditions. In other examples, the IMD 102 can include one or more electrodes configured to stimulate the nervous system of the patient or to provide stimulation to the muscles of the patient airway, etc.

The WMD 103 can include one or more wearable or external medical sensors or devices (e.g., automatic external defibrillators (AEDs), Holter monitors, patch-based devices, smart watches, smart accessories, wrist- or finger-worn medical devices, such as a finger-based photoplethysmography sensor, etc.).

The external system 105 can include a dedicated hardware/software system, such as a programmer, a remote server-based patient management system, or alternatively a system defined predominantly by software running on a standard personal computer. The external system 105 can manage the patient 101 through the IMD 102 or one or more other ambulatory medical devices connected to the external system 105 via a communication link 111. In other examples, the IMD 102 can be connected to the WMD 103, or the WMD 103 can be connected to the external system 105, via the communication link 111. This can include, for example, programming the IMD 102 to perform one or more of acquiring physiological data, performing at least one self-diagnostic test (such as for a device operational status), analyzing the physiological data, or optionally delivering or adjusting a therapy for the patient 101. Additionally, the external system 105 can send information to, or receive information from, the IMD 102 or the WMD 103 via the communication link 111. Examples of the information can include real-time or stored physiological data from the patient 101, diagnostic data, such as detection of patient hydration status, hospitalizations, responses to therapies delivered to the patient 101, or device operational status of the IMD 102 or the WMD 103 (e.g., battery status, lead impedance, etc.). The communication link 111 can be an inductive telemetry link, a capacitive telemetry link, or a radio-frequency (RF) telemetry link, or wireless telemetry based on, for example, "strong" Bluetooth or IEEE 802.11 wireless fidelity "Wi-Fi" interfacing standards. Other configurations and combinations of patient data source interfacing are possible.

The external system 105 can include an external device 106 in proximity of the one or more ambulatory medical devices, and a remote device 108 in a location relatively distant from the one or more ambulatory medical devices, in communication with the external device 106 via a communication network 107. Examples of the external device 106 can include a medical device programmer. The remote device 108 can be configured to evaluate collected patient or patient information and provide alert notifications, among other possible functions. In an example, the remote device 108 can include a centralized server acting as a central hub for collected data storage and analysis. The server can be configured as a uni-, multi-, or distributed computing and processing system. The remote device 108 can receive data from multiple patients. The data can be collected by the one or more ambulatory medical devices, among other data acquisition sensors or devices associated with the patient 101. The server can include a memory device to store the data in a patient database. The server can include an alert analyzer circuit to evaluate the collected data to determine if specific alert condition is satisfied. Satisfaction of the alert condition may trigger a generation of alert notifications, such to be provided by one or more human-perceptible user interfaces. In some examples, the alert conditions may alternatively or additionally be evaluated by the one or more ambulatory medical devices, such as the implantable medical device. By way of example, alert notifications can include a Web page update, phone or pager call, E-mail, SMS, text or "Instant" message, as well as a message to the patient and a simultaneous direct notification to emergency services and to the clinician. Other alert notifications are possible. The server can include an alert prioritizer circuit configured to prioritize the alert notifications. For example, an alert of a detected physiological event can be prioritized using a similarity metric between the physiological data associated with the detected physiological event to physiological data associated with the historical alerts.

The remote device 108 may additionally include one or more locally configured clients or remote clients securely connected over the communication network 107 to the server. Examples of the clients can include personal desktops, notebook computers, mobile devices, or other computing devices. System users, such as clinicians or other qualified medical specialists, may use the clients to securely access stored patient data assembled in the database in the server, and to select and prioritize patients and alerts for health care provisioning. In addition to generating alert notifications, the remote device 108, including the server and the interconnected clients, may also execute a follow-up scheme by sending follow-up requests to the one or more ambulatory medical devices, or by sending a message or other communication to the patient 101 (e.g., the patient), clinician or authorized third party as a compliance notification.

The communication network 107 can provide wired or wireless interconnectivity. In an example, the communication network 107 can be based on the Transmission Control Protocol/Internet Protocol (TCP/IP) network communication specification, although other types or combinations of networking implementations are possible. Similarly, other network topologies and arrangements are possible.

One or more of the external device 106 or the remote device 108 can output the detected physiological events to a system user, such as the patient or a clinician, or to a process including, for example, an instance of a computer program executable in a microprocessor. In an example, the process can include an automated generation of recommendations for anti-arrhythmic therapy, or a recommendation for further diagnostic test or treatment. In an example, the external device 106 or the remote device 108 can include a respective display unit for displaying the physiologic or functional signals, or alerts, alarms, emergency calls, or other forms of warnings to signal the detection of arrhythmias. In some examples, the external system 105 can include an external data processor configured to analyze the physiologic or functional signals received by the one or more ambulatory medical devices, and to confirm or reject the detection of arrhythmias. Computationally intensive algorithms, such as machine-learning algorithms, can be implemented in the external data processor to process the data retrospectively to detect cardia arrhythmias.

Portions of the one or more ambulatory medical devices or the external system 105 can be implemented using hardware, software, firmware, or combinations thereof. Portions of the one or more ambulatory medical devices or the external system 105 can be implemented using an application-specific circuit that can be constructed or configured to perform one or more functions or can be implemented using a general-purpose circuit that can be programmed or otherwise configured to perform one or more functions. Such a general-purpose circuit can include a microprocessor or a portion thereof, a microcontroller or a portion thereof, or a programmable logic circuit, a memory circuit, a network interface, and various components for interconnecting these components. For example, a "comparator" can include, among other things, an electronic circuit comparator that can be constructed to perform the specific function of a comparison between two signals or the comparator can be implemented as a portion of a general-purpose circuit that can be driven by a code instructing a portion of the general-purpose circuit to perform a comparison between the two signals. "Sensors" can include electronic circuits configured to receive information and provide an electronic output representative of such received information.

The therapy device 110 can be configured to send information to or receive information from one or more of the ambulatory medical devices or the external system 105 using the communication link 111. In an example, the one or more ambulatory medical devices, the external device 106, or the remote device 108 can be configured to control one or more parameters of the therapy device 110. The external system 105 can allow for programming the one or more ambulatory medical devices and can receives information about one or more signals acquired by the one or more ambulatory medical devices, such as can be received via a communication link 111. The external system 105 can include a local external implantable medical device programmer. The external system 105 can include a remote patient management system that can monitor patient status or adjust one or more therapies such as from a remote location.

Figure 2:
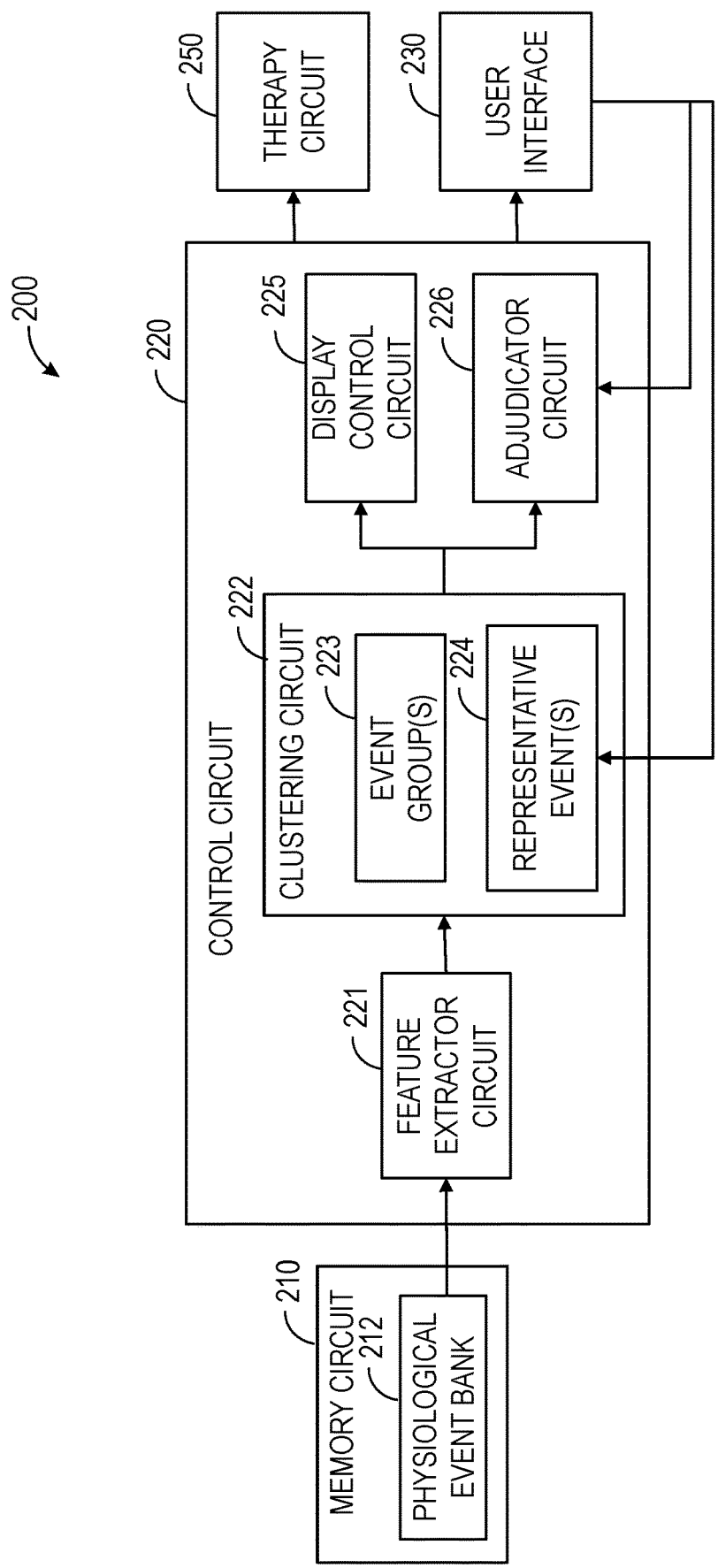
FIG. 2 illustrates generally an example of a physiological event management system configured to cluster physiological events to facilitate clinician review and adjudication.

FIG. 2 illustrates generally an example of a physiological event management system 200 configured to cluster physiological events to improve event presentation and adjudication. At least a portion of the system 200 can be implemented in the external system 105, such as one or more of the external device 106 or the remote device 108, or distributed between the external system 105 and one or more of the IMD 102 or the WMD 103.

The system 200 may include one or more of a memory circuit 210, a controller circuit 220, a user interface 230, and an optional therapy circuit 250. The memory circuit 210 may be included in a storage device in the external system 105, such as within the external device 106, or the remote device 108. Alternatively, the memory circuit 210 may be included in an electronic medical record (EMR) system. The memory circuit 210 may store patient physiologic event episodes such as detected and recorded by the AVID 102 or the WMD 103 in a physiological event bank 212. In an example, the memory circuit 210 may be communicatively coupled to the IMD 102 or the WMD 103, and receive the physiologic event episodes from the AVID 102 or the WMD 103, such as via the communication link 115, as to be discussed in reference to FIG. 3.

In an example, the physiologic event episodes stored in the physiological event bank 212 may include cardiac events such as cardiac arrhythmia episodes detected and recorded by the AVID 102 or the WMD 103. Examples of the cardiac arrhythmia episodes may include atrial arrhythmia episodes, supraventricular arrhythmia episodes, or ventricular arrhythmia episodes, among others. The cardiac arrhythmia episodes may include respective physiologic data sensed from one or more physiologic sensors during the detected arrhythmia event, or additional physiologic data sensed before and/or after the detected arrhythmia event. The physiologic data associated with an arrhythmia episode may include cardiac electrical signals such as one or more electrocardiogram (ECG) or electrogram (EGM) signals sensed at various cardiac sites using different electrode combinations, such as one or more atrial EGMs or one or more ventricular EGMs. Additionally or alternatively, the physiologic data may include cardiac mechanical signals or hemodynamic signals such as cardiac pressure signals, impedance signals, heart sounds signals, among others. In various examples, each cardiac arrhythmia episode may additionally include arrhythmia detection or classification generated by a medical device, such as the IMD 102 or the WMD 103. The arrhythmia detection or classification is a designation of a particular arrhythmia type, such as atrial fibrillation, atrial flutter, ventricular tachycardia, or ventricular fibrillation, among others. Other information about the cardiac arrhythmia episodes such as measurements or signal metrics obtained from the physiologic data (e.g., atrial rate, ventricular rate, variability of atrial or ventricular rate), may also be associated with respective episodes and stored in the physiological event bank 212.

In some examples, the physiological event bank 212 may include patient-triggered episodes, including physiologic data sensed from one or more physiologic sensors in response to a patient trigger, such as when the patient experiences a physiologic event onset. Other information such as patient input about presence of a physiologic event and severity of symptoms, timing information of the symptoms, such as onset and termination time of the patient-triggered episode, may also be associated with the patient-triggered episode and included in the physiological event bank 212.

Although the discussion of physiologic events management in this document is focused on arrhythmia episodes, this is meant to be illustrative rather than restrictive in nature or limiting in any way. Episodes of other types of physiologic events, such as syncope, worsening heart failure events, or heart failure decompensation events, may also be stored, analyzed, and provided to a clinician for adjudication using the systems, apparatus, and methods discussed in this document.

The controller circuit 220 may be implemented as parts of a microprocessor circuit, which may be a dedicated processor such as a digital signal processor, application specific integrated circuit (ASIC), microprocessor, or other type of processor for processing information including physical activity information. Alternatively, the microprocessor circuit may be a general-purpose processor that may receive and execute a set of instructions of performing the functions, methods, or techniques described herein.

The controller circuit 220 may include circuit sets comprising one or more other circuits or sub-circuits, including a feature extractor circuit 221, a clustering circuit 222, a display control circuit 225, and an adjudicator circuit 226. The circuits or sub-circuits may, alone or in combination, perform the functions, methods, or techniques described herein. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

The feature extractor circuit 221 can receive from the physiological event bank 212 information about physiological events, such as N events $\{X_1, X_2, \ldots, X_N\}$, and extract from each of the received events a respective feature set (e.g., a set of M features $\{S_1, S_2, \ldots, S_M\}$ for event $X_k$). In an example, the received information of the physiological events may include physiological data (e.g., ECGs, EGMs, or other sensor signals) recorded during (and optionally before and/or after) cardiac arrhythmia episodes detected by an ambulatory device, such as the AVID 102 or the WMD 103. The features extracted from each of the received arrhythmia episodes by the feature extractor circuit 221 (e.g., the M features $\{S_1, S_2, \ldots, S_M\}$) may include one or more of a heart rate distribution feature, an arrhythmia duration, or a morphology feature. The heart rate distribution feature is an important characterization of atrial or ventricular tachyarrhythmia, and can be represented by an amount of heart beats (or an accumulated time duration of those heart beats), or a percentage of total heart beats (or a percentage of time duration of the total heart beats), at each of a plurality of heart rates or a plurality of heart rate ranges during a specified time period. The arrhythmia duration represents a time duration from an arrhythmia onset to the termination, as detected by the AVID 102 or the WMD 103. The morphology feature includes signal waveform characteristics such as a slope, a peak amplitude, a curvature, an area under the curve, or a similarity metric (e.g., a correlation) between a portion of the episode signal and a predetermined morphology template. In some examples, the features extracted from each of the received arrhythmia episodes by the feature extractor circuit 221 may include temporal information of the arrhythmia episodes, such as time of day the arrhythmia episodes were detected and recorded by the IMD 102 or the WMD 103.

The clustering circuit 222 can cluster the received physiological events into different event groups 223 based on the feature sets of the received physiological events, such as the M features $\{S_1, S_2, \ldots, S_M\}$ for each of the N events $\{X_1, X_2, \ldots, X_N\}$. The extracted features sets can form a feature space S, such as an M-dimensional space spanned by M features $\{S_1, S_2, \ldots, S_M\}$. Each physiological event can be represented as a data point in the feature space S. In an example, clustering can be performed using an unsupervised clustering algorithms. To cluster the physiological events, the clustering circuit 222 can initialize one or more clusters each containing, for example, a randomly selected physiological event. A physiological event (e.g., $X_k$) can be assigned to one of the event groups 223 based on a similarity metric between said physiological event and the cluster center. Examples of the similarity metric can include a distance measure (e.g., a Euclidean distance), connectivity, or intensity between the respective feature sets of the physiological event and the cluster center in the feature space S. A larger distance indicates less similarity between the physiological event and the cluster center. The cluster center can be iteratively updated using a central tendency (e.g., mean or median) of feature sets respectively extracted from the physiological events assigned to that event group, until a convergence criterion or an iteration stopping criterion is met.

Various clustering algorithms may be used to cluster the received physiological events. The clustering algorithms may differ in a set of rules for defining similarities among data points in a feature space. One category of clustering algorithms is based on centroid models that interactively establish clustered event groups using a similarity metric derived by the closeness of a data point to a centroid of a cluster. In an example, the clustering circuit 222 can use a k-mean clustering method that minimizes within-cluster variances among the set of physiological events in the same clustered event group. When the N events are clustered into k groups, the k-mean clustering method minimizes the sum of within-cluster variances of all k groups. In some examples, variations of k-means clustering may be used to cluster the N physiological events. In an example, k-medians clustering uses the median (instead of mean) in each feature dimension to determine the centroid or cluster center for each cluster. In another example, k-medoids uses actual data points (observations) as cluster centers, instead of the calculated means of the data points in the cluster which are not necessarily actual input data points. Furthermore, k-medoids minimizes a sum of pairwise dissimilarities instead of a sum of squared Euclidean distances, which can be more robust to noise and outliers than k-means clustering. In yet another example, a fuzzy C-means clustering can be used to cluster the received physiological events. In contrast to hard clustering (such as k-means clustering) where a data point is either assigned to a cluster or not, the fuzzy C-means clustering is a soft clustering method that assigns each data point with a fuzzy degree representing a probability or likelihood of that data point belonging to each of two or more clusters. The fuzzy C-means is a soft clustering technique. In addition or alternative to the k-mean clustering or variations thereof, other clustering methods may be used, such as clustering based on statistical distribution models (e.g., Gaussian mixture models), connectivity-based clustering that defines a cluster by the maximum distance needed to connect different parts of the cluster, density-based clustering methods that define clusters as areas of higher density than the remainder of the data set, among others.

The one or more clustered event groups 223 each include a respective set of physiological events, which is a subset of the received N events $\{X_1, X_2, \ldots, X_N\}$. The clustering circuit 222 may determine from each of the clustered event groups 223 a respective representative event 224 representing the physiological events in the corresponding event group. In an example, the representative event 224 can be identified as a physiological event in the event group closest in distance (e.g., Euclidean distance in the feature space S) to a centroid of the physiological events in that event group. For example, for a clustered event group of P physiological events $\{Y_1, Y_2, \ldots, Y_P\}$, a cluster center $Y^*$ can be determined as the centroid of the feature sets (e.g., M-dimensional feature sets) respectively extracted from the physiological events $\{Y_1, Y_2, \ldots, Y_P\}$. The physiological event in the group (e.g., $Y_k$) closest in distance to the cluster center $Y^*$ can be identified as the representative event. Examples of clustering the physiological events using supervising clustering algorithms and determining the representative event are discussed below with respect to FIG. 4A.

In addition or alterative to the automatic, unsupervised learning-based clustering such as k-means clustering (or its variations), in some examples, the clustering circuit 222 can cluster the received physiological events in accordance with a user-specified cluster center and a set of clustering rules. In an example, a user may designate a physiological event (e.g., $X_k$ selected from the N events $\{X_1, X_2, \ldots, X_N\}$) as the cluster center. The clustering circuit 222 can compute similarity metrics (e.g., Euclidean distances in the feature space S) between the user-specified cluster center and each of the N physiological events using their respective feature sets. The clustering circuit 222 can then establish a clustered event group by assigning those physiological events with respective similarity metrics satisfying a similarity criterion (e.g., respective Euclidean distances to the cluster center falling below a threshold). Examples of clustering the physiological events using user specified cluster center and clustering criterion are discussed below with respect to FIG. 4B.

The display control circuit 225 can prioritize display of the set of physiological events in each event group 223 on a display unit of the user interface 230. In an example, at least a portion of the user interface 230 may be implemented in the external system 105. Information of the physiological events being displayed can include physiological data (e.g., ECGs, EGMs, or other sensor signals) recorded during (and optionally before and/or after) the physiological event, device parameters used for detecting the physiological event, and a summary of the detection results including, for example, detected event type and statistics. In an example, the prioritized display of event information can include an automatic display of information about the representative event of an event group, and hide information about other physiological events (other than the representative event) in the event group from displaying until and unless requested by a user. In an example, the display control circuit 225 can provide a notification to the user (e.g., a message displayed on the user interface 230) indicating that the representative event represents a set of physiological events in an event group without automatically displaying information about individual physiological event other than the representative event, and prompt the user to provide a command to display information about any of the physiological events in the event group. Responsive to a user command, the display control circuit 225 can initiate an on-demand display of information about one or more physiological events in the event group. In an example, the user command may include a user selection of a physiological event from the event group. In response to the user selection, the display control circuit 225 can display information about the selected physiological event.

Figure 3:
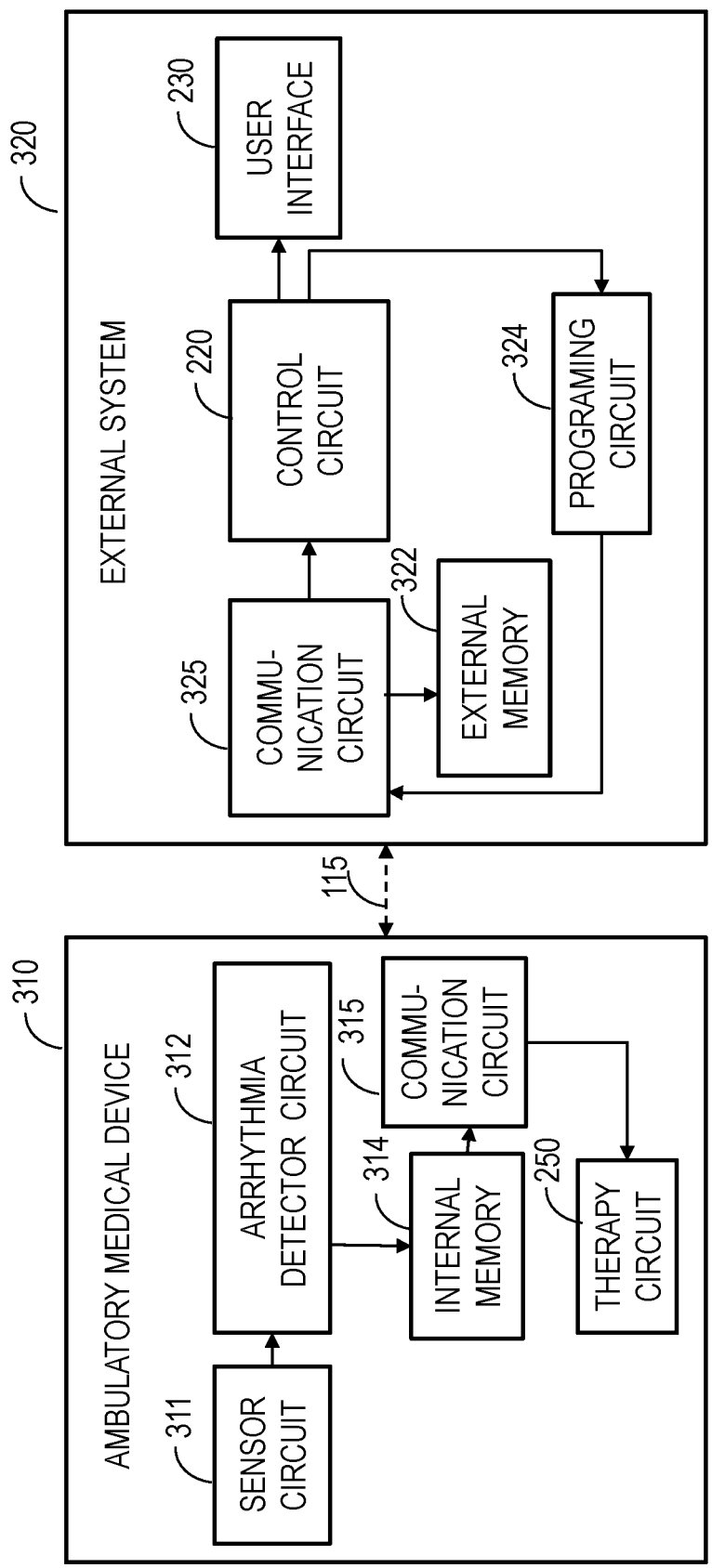
FIG. 3 illustrates generally an example of a cardiac event management system configured to evaluate and prioritize cardiac events detected by a medical device associated with a patient.

In some examples, the control circuit 220 can prioritize storage of the set of physiological events in each event group 223 in a storage device, such that high-priority events can be stored in a storage device (e.g., the internal memory 314 or the external memory 322 as shown in FIG. 3) before low-priority events in the same group, and/or more system resources (e.g., memory space) may be allocated for storing high-priority events than for lower-priority events. In an example, representative events of respective event groups can have higher priorities to be stored in a storage device than other events in the respective event groups. To conserve memory, in some examples, only representative events of respective event groups are stored in a storage device, and other events in the respective event groups can be discarded (i.e., not stored). In some examples, within a clustered event group, events dissimilar to the representative event (the "dissimilar" events with similarity values below a threshold, or farther away from the representative event or the cluster center in the feature space S) can have higher priorities than events similar to representative event (e.g., the "similar" events with similarity values above the threshold, or closer to the representative event or the cluster center in the feature space S). As the "similar" events are better represented by the representative event that the "dissimilar" events, prioritizing the "dissimilar" events over the "similar" events can allow the "dissimilar" events to be preserved, presented to the user, get reviewed and adjudicated, thereby reducing error rate associated with assigning the same adjudication of the representative event to all other events in the same event group. In some examples, high-priority events can be automatically stored in the storage device, while the low-priority events can be stored on demand (i.e., upon request by a user). In some examples, prioritization of events across different clustered event groups can be based on number of events in the respective event groups to ensure various event types can be reviewed and adjudicated. For example, between a "dense" event group with a large number of events and a "sparse" event group with a relatively small number of events, more events from the "dense" event group can be assigned with high priorities than from the "sparse" event group. The cluster-based prioritized display and prioritized storage of physiological events as described herein advantageously make more efficient use of system sources, and improve the functionality of a computer system for managing physiological events.

The adjudicator circuit 226 may receive a user adjudication of a physiologic event in a clustered event group 223. A user may provide adjudication through the user interface 230. The adjudication may include a user designation of an event type for the physiological event being presented to the user. In an example of arrhythmia adjudication, the user may identify an arrhythmia type, such as an atrial fibrillation, atrial flutter, supraventricular tachycardia, ventricular tachycardia, or ventricular fibrillation. The adjudicator circuit 226 may compare the user identified event type to the device detection result generated by the AVID 102 or the WMD 103, and identify the episode as a true positive (TP) (or appropriate) detection if the user adjudication is in agreement with the device detection result, or a false positive (FP) (or inappropriate) detection if the user adjudication is different from the device detection result. An episode may be identified as indeterminate if no TP or FP decision can be made. Additionally, the user may provide annotations with regard to episode characterization or diagnostic information for the physiologic event episode. For example, when adjudicating a device-detected AF episode, a user (e.g., a clinician) may designate one of a plurality of episode characterizations as a rationale for forming his or her adjudication decision. Examples of a user inface for receiving adjudication or annotation of the physiological event are discussed below with reference to FIG. 5.

In some examples, the adjudicator circuit 226 can adjudicate physiological events in a clustered event group when the information (e.g., ECG, EGM, or other sensor data) about such events is displayed on the user interface. In accordance with the prioritized display of the physiological events in a clustered event group, the adjudicator circuit 226 can prioritize event adjudication in an order of the events being displayed. For example, as the representative event gets automatically displayed prior to other events in the same event group, the representative event can be adjudicated prior to other physiological events that are displayed on demand. In some examples, upon an adjudication of the representative event, the adjudicator circuit 226 can assign the same adjudication of the representative event to each of the physiological events in the event group. As such, unless modified otherwise (e.g., by a user), all the physiological events in the event group by default will have the same event type as the adjudicated representative event. In an example, responsive to an on-demand display of a physiological event selected from the clustered event group, the adjudicator circuit 226 may initiate an on-demand adjudication of such physiological event, allowing a user to confirm, reject, or modify the default adjudication. The cluster-based prioritized display and adjudication as discussed herein can not only improve functionality of a computer system for managing physiological events, but can also reduce a clinician's workload and improve the efficiency of physiological event review and adjudication.

In some examples, as more additional physiological events are detected from the patient and added to the event bank 212, the controller circuit 220 may update previously established clusters using information about those additional physiological events. The update of the clusters can be carried out periodically, or in response to the volume of received additional events reaching a threshold. In some examples, the controller circuit 220 may initiate a process of updating the clusters based on the adjudication performance. The adjudication performance can be measured by an estimate of amount of workload reduction and an estimate of adjudication error rate associated with assigning the same adjudication of the representative event to all other physiological events in the same event group. In an example, the controller circuit 220 may generate an estimate of the adjudication error rate based on on-demand adjudication of physiological events (other than the representative event) in a clustered event group. If the estimated error rate exceeds an error tolerance level, the controller circuit 220 can update the clusters, such as by reinitiating a clustering process using an updated set of received arrhythmia episodes, or by adjusting one or more clustering criteria (e.g., a similarity metric or distance threshold that defines a cluster). In another example, the controller circuit 220 can determine a performance metric proportional to the amount of workload reduction and inversely proportional to the adjudication error rate, such that a high workload reduction would cause an increase the performance metric, and a high adjudication error would decrease the performance metric. The controller circuit 220 can update the clusters if the performance metric falls below a performance threshold. The update of the clusters can include an update of representative events of respective clusters. The updated representative events In some example, an aggressiveness of adjustment of one or more clustering criteria (e.g., a similarity metric threshold that defines the size or boundaries of a clustered event group) can be determined based on a deviation of the performance metric from the performance threshold. A more aggressive adjustment (e.g., a substantial reduction of the similarity threshold) can be made responsive to a more substantial deterioration in adjudication performance.

The user interface 230, as discussed previously, may include a display unit controllable by the display control circuit 225 to display information about the physiological events, and a user input device to receive user input, such as adjudication of a physiological event being displayed on the display unit. The user interface 230 may be coupled to a printer for printing hard copies of the detection information. The information may be presented in a table, a chart, a diagram, or any other types of textual, tabular, or graphical presentation formats. The presentation of the output information may include audio or other media format. In an example, the output unit may generate alerts, alarms, emergency calls, or other forms of warnings to signal the user about the detected physiological events. In some examples, the user interface 230 may additionally generate a recommendation for adjusting operation of the AVID 102 or the WMD 103 based on the adjudication of the physiological events, such as a recommended adjustment of a parameter for sensing a physiological signal or a parameter for detecting a physiological event.

The optional therapy circuit 250 may be configured to deliver a therapy to the patient in response to the detection of target physiological event. Examples of the therapy may include electrostimulation therapy delivered to the heart, a nerve tissue, other target tissues, a cardioversion therapy, a defibrillation therapy, or drug therapy including delivering drug to a tissue or organ. In some examples, the therapy circuit 250 may modify an existing therapy, such as adjust a stimulation parameter or drug dosage.

FIG. 3 illustrates generally an example of a cardiac event management system 300 configured to evaluate and prioritize cardiac events detected by a medical device associated with a patient. The system 300 comprises an ambulatory medical device (AMD) 310 and an external system 320, communicatively coupled to each other via the communication link 115. The AMD 310, which is an embodiment of the IMD 102 or the WMD 103 as illustrated in FIG. 1, may include a sensor circuit 311 for sensing one or more physiologic signals from a subject. The physiologic signals may be sensed via one or more implantable, wearable, or otherwise ambulatory sensors or electrodes associated with the patient. The sensors may be incorporated into, or otherwise associated with an ambulatory device such as the IMD 102 or the WMD 103. Examples of the physiologic signals may include surface electrocardiography (ECG) sensed from electrodes placed on the body surface, subcutaneous ECG sensed from electrodes placed under the skin, intracardiac electrogram (EGM) sensed from the one or more electrodes on a lead system, thoracic or cardiac impedance signal, arterial pressure signal, pulmonary artery pressure signal, left atrial pressure signal, RV pressure signal, LV coronary pressure signal, coronary blood temperature signal, blood oxygen saturation signal, heart sound signal such as sensed by an ambulatory accelerometer or acoustic sensors, physiologic response to activity, apnea hypopnea index, one or more respiration signals such as a respiration rate signal or a tidal volume signal, brain natriuretic peptide (BNP), blood panel, sodium and potassium levels, glucose level and other biomarkers and bio-chemical markers, among others. The sensor circuit 311 may include one or more sub-circuits to digitize, filter, or perform other signal conditioning operations on the received physiologic signal. In some examples, the sensor circuit 311 may register a patient-triggered episode. When the patient demonstrates certain signs or symptoms or experiences a precursor event indicative of a target physiological event, a trigger may be produced and detected by a patient trigger detector. A detection of the patient trigger may activate the sensor circuit 311 to register the patient-triggered episode, and to acquire physiologic data such as one or more physiologic signals.

The arrhythmia detector circuit 312 may be configured to detect a cardiac arrhythmia episode using the sensed one or more physiologic signals. Examples of the cardiac arrhythmias may include an atrial fibrillation, atrial flutter, supraventricular tachycardia, ventricular tachycardia, or ventricular fibrillation. The detection may be based on timing or morphological features extracted from the one or more physiologic signals. In an example, the arrhythmia detector circuit 312 may detect a specific cardiac arrhythmia using a configurable detection algorithm, such that one or more detection algorithm features may be added or modified via a programming device. The detected arrhythmia episodes, including physiologic data collected during, or additionally before and/or after, the detection, as well as the detection results, may be stored in the internal memory 314.

The communication circuit 315 may transmit the detected arrhythmia episodes (including physiologic data and device-generated detection results) to the external system 320 via the communication link 115. The transmission may be carried out continuously, periodically at scheduled time, or in response to a data interrogation command sent to the AMD 310 from the external system 320. The external system 320, which is an embodiment of the external system 105 as show in FIG. 1, may receive the arrhythmia episodes via a communication circuit 325, and store the received arrhythmia episodes in an external memory 322. The external memory 322, which is an embodiment of the memory circuit 210, may store the arrhythmia episodes in the physiological event bank 212. The external system 320 may also include the controller circuit 220 and the user interface 230. The controller circuit 220 may schedule a presentation of one or more of the arrhythmia episodes for adjudication. As descried above with reference to FIG. 2, the controller circuit 220 may cluster the received arrhythmia episodes into different event groups each including a set of episodes represented by a representative episode in the corresponding event group, and prioritize display of the arrhythmia episodes in the clustered event group. The user interface 230 may initiate an automatic display of the information (e.g., physiological data and the AMD detection results) about the representative episode in a clustered event group, and initiate an on-demand display of the information about other arrhythmia episodes in the clustered event group responsive to a user command. The user interface 230 may additionally receive a user adjudicated arrhythmia type for the representative episode. All the arrhythmia episodes in the event group by default will have the same user-adjudicated arrhythmia type as the representative event, unless modified by the user via an on-demand adjudication process, as described above with reference to FIG. 2. In some examples, the controller circuit 220 may assign an arrhythmia episode received from the AMD 310 to one of the established clustered event groups, such as based on its similarity (e.g., a distance in the feature space S) to each of the representative episodes of respective clustered event groups. The assigned arrhythmia episode can have by default the same adjudicated arrhythmia type as the representative episode, unless and until modified by the user via an on-demand display and adjudication process.

The external system 320 includes a programmer 324 that may generate commands for programming the AMD 310. The commands may include recommended adjustment of one or more detection parameters for the arrhythmia detector circuit 312, or data collection parameters for the sensor circuit 311, among others. The recommended adjustment may be confirmed or otherwise modified by a user (e.g., a clinician) via the user interface 230, and forwarded to the AMD 310 via the communication link 115. The AMD 310 may detect a target physiological event using the modified algorithm.

Although FIG. 3 shows that the controller circuit 220 is included in the external system 320, this is by way of example but not limitation. In some examples, at least a portion of the controller circuit 220 (such as the feature extractor circuit 221 and the clustering circuit 222) can be implemented in the AMD 310, while some other portions of the controller circuit 220 (such as the display control circuit 225 and the adjudicator circuit 226) can be implemented in the external system 320. In the AMD 310, arrhythmia episodes detected by the arrhythmia detector circuit 312 and/or the arrhythmia episodes stored in the internal memory 314 can be processed by the feature extractor circuit 221 and the clustering circuit 222, and get clustered into one or more clustered event groups. The clustered arrhythmia episodes can be stored in the internal memory 314, and transmitted to the external system 320 via the communication link 115 automatically or upon user request.

Storage and/or transmission of episode data can be prioritized in accordance with the clustering of the episodes. High-priority episodes can be stored in a storage device (e.g., the internal memory 314 or the external memory 322) and/or get transmitted between devices (e.g., from the ambulatory medical device 310 to the external system 320) before low-priority episodes in the same group. Additionally or alternatively, more system resources (e.g., memory space and/or communication bandwidth) may be allocated for storing and/or transmitting high-priority episodes than for storing and/or transmitting lower-priority episodes. In an example, representative episodes of respective event groups can have higher priorities than other episodes in the respective event groups. In some examples, within a clustered event group, higher priorities can be assigned to the "dissimilar" episodes (with similarity values below a threshold) than the "similar" events (with similarity values above the threshold). Prioritizing "dissimilar" events over the "similar" events can allow the "dissimilar" events to be preserved, presented to the user, get reviewed and adjudicated, thereby reducing error rate associated with assigning the same adjudication of the representative event to all other events in the same event group. In some examples, prioritization of episodes across different clustered event groups can be based on number of events in the respective event groups to ensure various event types get to be reviewed and adjudicated. In some examples, high-priority events can be automatically stored in the storage device and/or transmitted between devices, while the low-priority events can be stored and/or transmitted on demand (i.e., upon request by a user). To conserve system resources (e.g., memory space and/or communication bandwidth), in some examples, only representative episodes of respective event groups are stored and/or transmitted, while other events in the respective event groups can be discarded.

In the external system 320, the display control circuit 225 can prioritize display of the arrhythmia episodes of the clustered event group, such as an automatic display of information about the representative episode while hiding other episodes in the event group from displaying until and unless requested by a user (i.e., on-demand display of other episodes). The adjudicator circuit 226 can receive a user adjudicated arrhythmia type for the representative episode of the event group. The programmer 324 can generate commands for programming the AMD 310.

Figure 4:
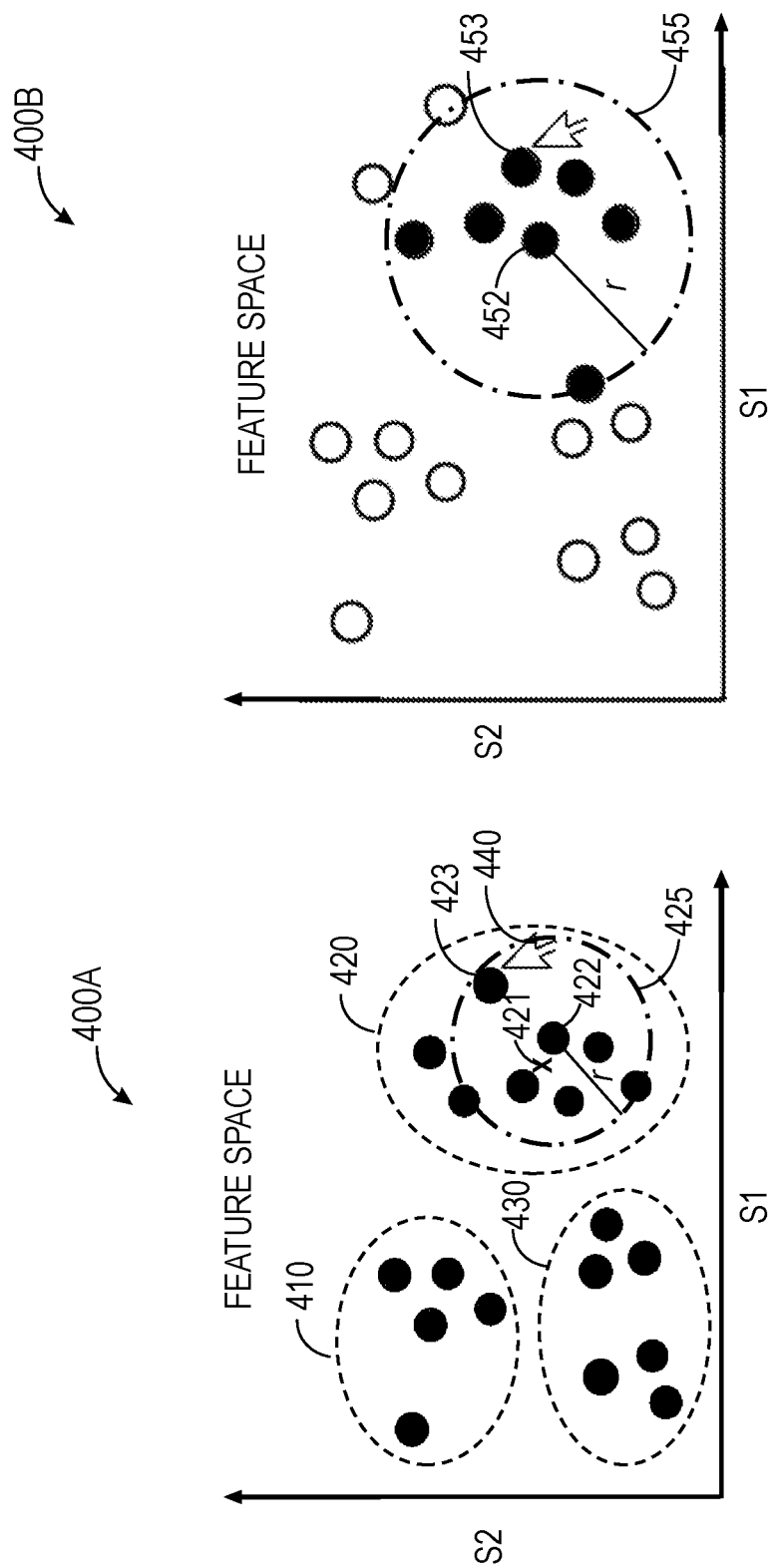
FIG. 4A-4B illustrate examples of clustering the physiological events in a feature space using an unsupervised clustering algorithm (FIG. 4A) or a user specified cluster center and clustering criterion (FIG. 4B).

FIGS. 4A-4B illustrate examples of clustering the physiological events in a feature space S. Each physiological event is represented by a data point in a graphical representation of the feature space S. The coordinates of a data point correspond to respective values of a set of features extracted from the corresponding physiological event. By way of example and not limitation, each physiological event, as shown in FIGS. 4A and 4B, is represented by a data point in a two-dimensional feature space spanned by features $S_1$ and $S_2$. In an example of clustering cardiac arrhythmia episodes detected by a medical device from the patient, the feature set may include a heart rate distribution feature, an arrhythmia duration, a morphology feature, or a temporal feature such as a time of day the arrhythmia episodes were detected. The diagrams shown in FIGS. 4A and 4B may each be displayed on a display unit of the user interface 230.

FIG. 4A illustrates automatic clustering of the physiological events using an unsupervised clustering algorithm, such as a k-means clustering or an variation thereof, as described above with reference to FIG. 2. As shown in diagram 400A, three clustered event groups 410, 420, and 430 were formed, each including a respective set of physiological events and a cluster center (e.g., a centroid) that represents all the physiological events in that event group. For example, the clustered event group 420 has a cluster center 421. The clustering circuit 222 can determine, from the event group 420, a representative event 422 closest in distance to the cluster center 421. The representative event 422 and an indication that the representative event 422 represents the physiological events of the event group 420 can be displayed on the user interface 230.

Figure 5:
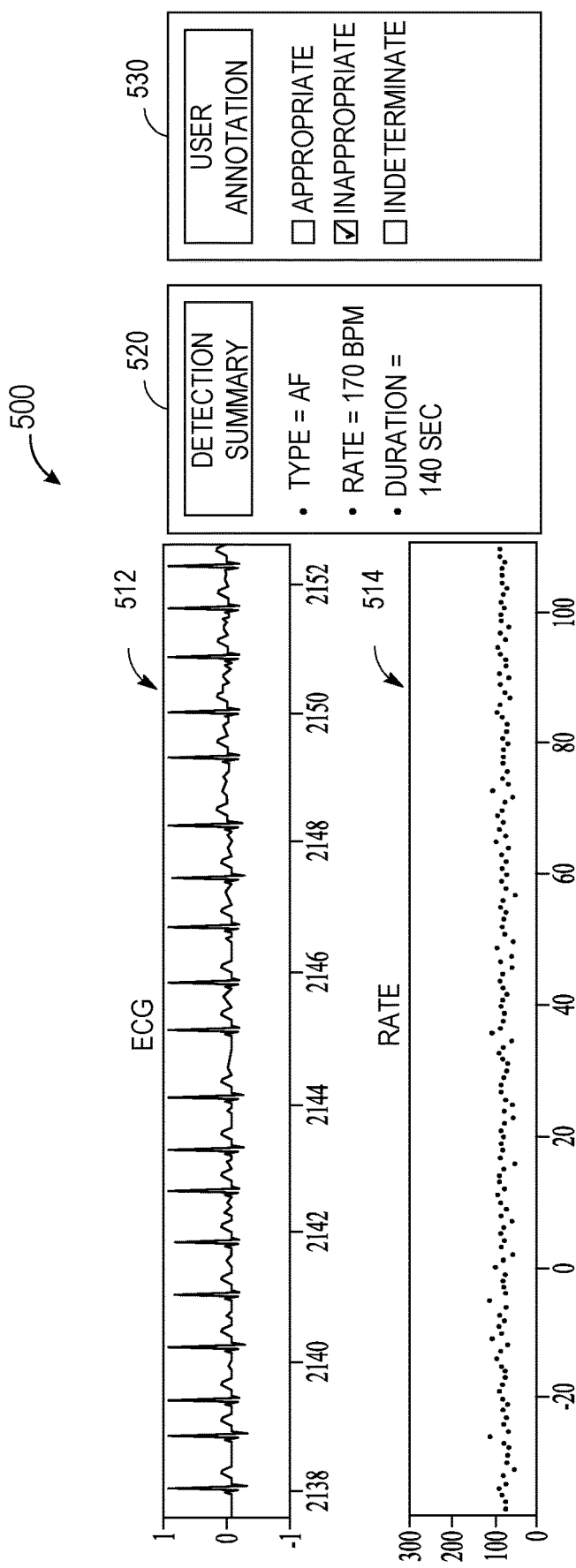
FIG. 5 illustrates an example of at least a portion of a user interface that displays information about a physiologic event and receives a user adjudication of said event.

Information about the representative event 422 can be automatically displayed on the user interface 230, and a user adjudication of the representative event 422 can be received from the user. FIG. 5 illustrates an example of at least a portion of a user interface 500, an embodiment of the display unit of the user interface 230, for displaying information about a physiologic event and receiving a user adjudication of said event. By way of example and not limitation, the information may include physiologic data 512 and a trend of measurements 514 taken from the physiologic data 512. Information about the patient identification and episode number may also be displayed, and may be selected such as using drop-down lists, check boxes, radio buttons, list boxes, buttons, toggles, text fields, among other input control elements on the user interface 400. The physiologic data 512 may be sensed using electrodes or physiologic sensors in communication with the medical device, and collected during, or alternatively before or after, the detected physiologic event. By way of non-limiting example as illustrated in FIG. 5, the physiologic data 512 includes an ECG or an EGM sensed at a cardiac site, such as a ventricle. In some examples, two or more physiologic signals may be displayed, including EGMs from multiple cardiac sites or via different sensing electrode configurations, cardiac mechanical signals, or hemodynamic signals sensed from one or more sensors. The trend of measurements 514 may include within-channel or inter-channel timing information, such as a heart rate trend, a heart rate variability trend, or an atrioventricular interval trend. The displayed information may include a detection summary 520. By way of example, the detection summary 520 may include a physiologic event type detected by the AMD, and measurements from the sensed physiologic signals as taken by the AMD. In the example illustrated in FIG. 5, the displayed episode is detected as an AF episode having a ventricular rate of 170 bpm and a duration of 140 seconds.

The user interface portion 500 may include a display zone to receive user annotation 530 of the displayed episode, such as an adjudication of an event type (e.g., a particular arrhythmia type), or a designation of appropriate (e.g., true positive) detection indicating a user agreement with the device-detected arrhythmia type, or inappropriate (e.g., false positive) detection indicating a user disagreement with the device-detected arrhythmia type.

Referring back to FIG. 4A, in addition to automatic display of the information about the representative event 422, information about other events in the same event group, such as event 423, may be displayed in response to a user command. As illustrated, the user may select an event in the clustered event group (e.g., event 423) using a pointing device, as shown by the mouse pointer 440 on the user interface. In response to the user selection, information about the selected event 423 can be displayed in a similar fashion as the automatic display of the representative event 422, as illustrated in FIG. 5. Responsive to the on-demand display of event 423, a user can be prompted to provide on-demand adjudication or annotation for the selected event 423.

As described above with reference to FIG. 2, upon an adjudication of the representative event 422, the adjudicator circuit 226 can assign the same adjudication of the representative event to each of the physiological events in the event group. The cluster-based prioritized display and prioritized adjudication of physiological events as described herein advantageously make more efficient use of system sources, and improve the functionality of a computer system for managing physiological events. It may also reduce a clinician's workload and improve the efficiency of clinician review and adjudication of physiological events. In some examples, the user can further identify a subset, but not all, of the physiological events in the event group. The identified subset includes physiological events with respective similarity metrics falling below a similarity threshold. The physiological events in the identified subset can be assigned with the same event type as the representative event. For example, the user can identify, in the feature space S, a bounded region 425 encompassing the representative event 422. The bounded region 425 can have user-defined boundaries. In the example as shown in FIG. 4A, the user may define the bound region 425 centered on the representative event 422 with a radius "r". The radius "r" can be adjustable by the user via the user interface. In an example, the user can select from a plurality of pre-defined regions of different sizes or shapes centered on the representative event 422. In an example, the user can select from a plurality of pre-determined radii, such as one of a "large", a "medium", or a "small" radius with respective pre-determined values. Alternatively, the user can select from a plurality of pre-defined regions each representing different density levels of physiological events in respective clustered event groups. In an example, the pre-defined regions may include a "dense cluster" (a small region with densely clustered events in the feature space), a "spare cluster" (a large region with sparsely distributed events in the feature space), or any intermediate density levels (e.g., a medium dense cluster, a medium sparse cluster).

Figure 6:
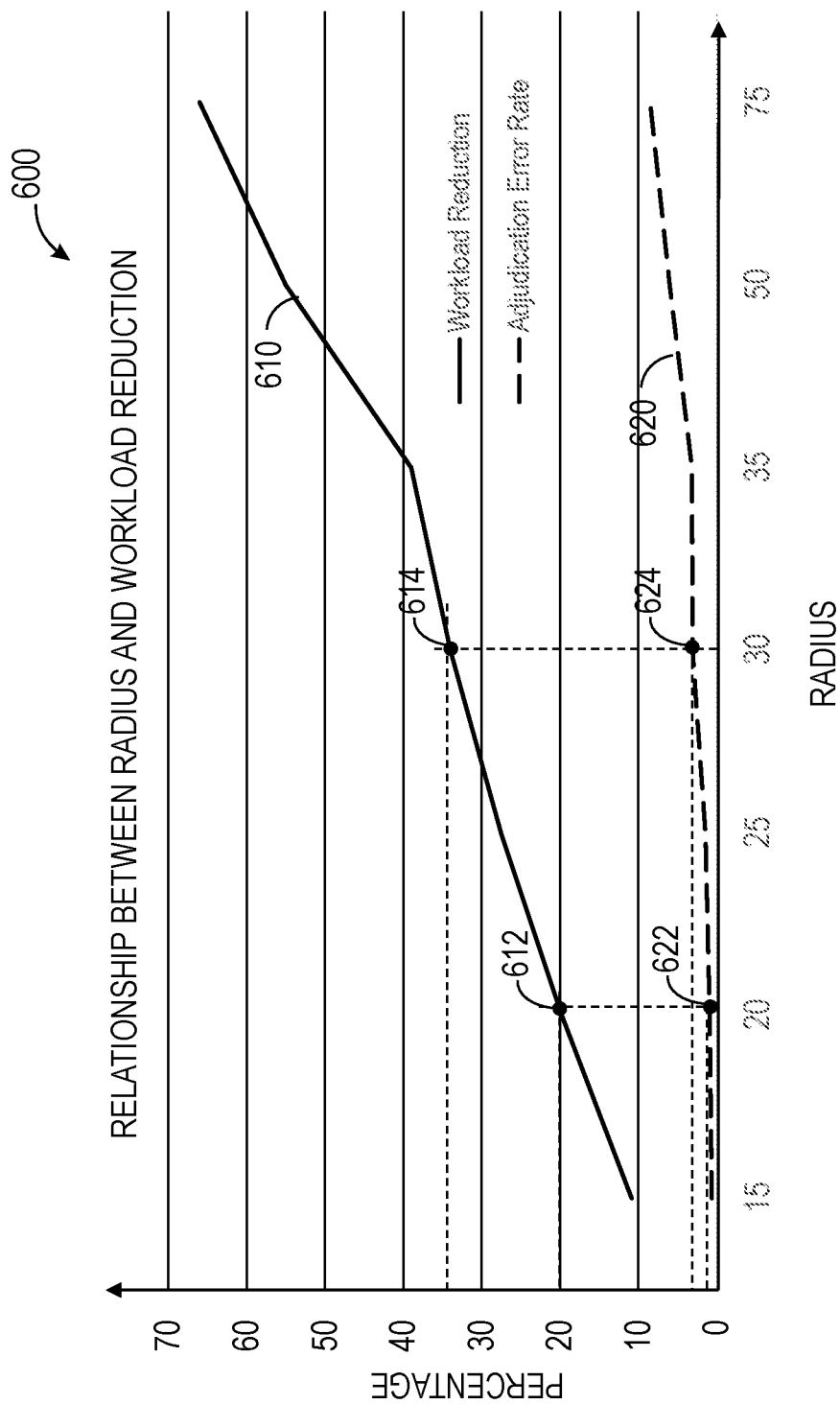
FIG. 6 illustrates an example of a workload reduction curve and an adjudication error rate curve at different radius values corresponding to user-defined clustered event regions.

As the radius "r" represents a similarity threshold to the representative event 422, the choice of radius "r" can have an impact on the adjudication performance, as measured by an amount of workload reduction and an adjudication error rate associated with assigning the same adjudication of the representative event to all other physiological events in the user-defined subgroup. FIG. 6 illustrates an example of a workload reduction curve 610 and an adjudication error rate curve 620 at different radius values corresponding to user-defined cluster event regions. The workload reduction curve 610 shows a relationship between the amounts of workload reduction (for reviewing and adjudicating the events) and radius values. The adjudication error rate curve 620 shows the adjudication error rates at different radius values. When a small radius "r" is used, more physiological events are kept out of the bounded region 425, and not assigned with the default adjudication (the same adjudication as the representative event 422). Adjudication of such out-of-region physiological events would increase a clinician's workload (i.e., less workload reduction). On the other hand, since the events within the bounded region 425 defined by a small radius "r" are more similar (or closer in distance) to the representative event 422, the default adjudication (the same adjudication as the representative event 422) is more likely to be accurate, and a lower adjudication error rate can be expected. Conversely, a large radius "r" would result in a larger bounded region 425 and more physiological events being assigned with the default adjudication (the same adjudication as the representative event 422). This may reduce the workload but potentially increase the adjudication error rate. As an example as shown in FIG. 6, when the radius "r" is increased from 20 to 30, the workload reduction increases from approximately 20% (data point 612) to 35% (data point 614), while the adjudication error rate increase from approximately 1% (data point 622) to 3% (data point 624).

In an example, a user may provide an expected amount of workload reduction or an error tolerance level associated with assigning the same adjudication of the representative event 422 to all the events within the bounded region 425, the controller circuit 220 can determine the radius "r" based on the expected amount of workload reduction or the error tolerance level. In another example, the controller circuit 220 can determine a performance metric proportional to the amount of workload reduction and inversely proportional to the adjudication error rate, such that a high workload reduction would cause an increase the performance metric, and a high adjudication error would decrease the performance metric. The controller circuit 220 can determine an "optimal" radius corresponding to the performance metric exceeding a performance threshold.

FIG. 4B illustrates clustering the physiological events using user specified cluster center and clustering criterion. As shown in diagram 400B, a user may designate a physiological event (e.g., event 452) as the center, or the representative event, of a clustered event group yet to be established. In an example, the user may adjudicate the designated representative event (e.g., event 4520 prior to clustering the events. To establish a clustered event group, the clustering circuit 222 can compute similarity metrics between each of the physiological events and the representative event 452 using respective feature sets, and establish a clustered event group by assigning those physiological events with respective similarity metrics satisfying a similarity criterion. In an example, the similarity metrics include a Euclidean distance in the feature S, and the clustered event group can be established to include those physiological events within a bounded region 455 centered on the representative event 452 with a radius "r". The radius "r" can be adjustable by the user via the user interface. In an example, the user can select one of a plurality of pre-determined radii, such as one of a "large", a "medium", or a "small" radius with respective pre-determined values. Alternatively, the user can select from a plurality of pre-defined regions identified as a "dense cluster" (a small region with densely clustered events in the feature space), a "spare cluster" (a large region with sparsely distributed events in the feature space), or any intermediate density levels (e.g., a medium dense cluster, a medium sparse cluster).

Information about the representative event 452 can be automatically displayed on the user interface 230. A user adjudication of the representative event 452 can be received from the user, as illustrated in FIG. 5. As similarly described above with reference to FIG. 4A, information about other events in the same event group, such as event 453, may be displayed in response to a user command. Responsive to the on-demand display of event 453, a user may be prompted to provide on-demand adjudication or annotation for the selected event 453.

Upon an adjudication of the representative event 452, the adjudicator circuit 226 can assign the same adjudication of the representative event to each of the physiological events within the bounded region 455. As discussed above with reference to FIG. 4A, the radius "r" that defines the bounded region 455 can affect workload reduction and adjudication error rate associated with assigning the adjudication of the representative event 452 to all other physiological events in the user-defined subgroup. As illustrated in FIG. 6, a small radius "r" would result in less workload reduction and a lower adjudication error. Conversely, a large radius "r" would result in more workload reduction and a higher adjudication error rate. A user may provide an expected amount of workload reduction or an error tolerance level associated with assigning the same adjudication of the representative event 452 to all the events within the bounded region 455, the controller circuit 220 can determine the radius "r" based on the expected amount of workload reduction or the error tolerance level.

In an example, the controller circuit 220 determine a value of the radius "r" for a given amount of workload reduction (e.g., 50% reduction of event data to be reviewed) or a set time of review and adjudication (e.g., 15 minutes), and based on the radius "r" value, determine an estimated error rate. A notification or an alert may be generated and presented to the user via the user interface 230 when the actual error rate (for a set review and adjudication time) exceeds a threshold error rate. In another example, the controller circuit 220 can determine a value of the radius "r" for a given error tolerance rate (e.g., 20%), and based on the radius "r" value, determine an estimated amount of workload reduction or an estimated time for review and adjudication. A notification or an alert may be generated and presented to the user via the user interface 230 when the actual review and adjudication time (for a given error rate) exceeding a threshold review and adjudication time.

In another example, the controller circuit 220 can determine a performance metric proportional to the amount of workload reduction and inversely proportional to the adjudication error rate, such that a high workload reduction would increase the performance metric, and a high adjudication error would decrease the performance metric. The controller circuit 220 can determine an "optimal" radius corresponding to the performance metric exceeding a performance threshold.

Figure 7:
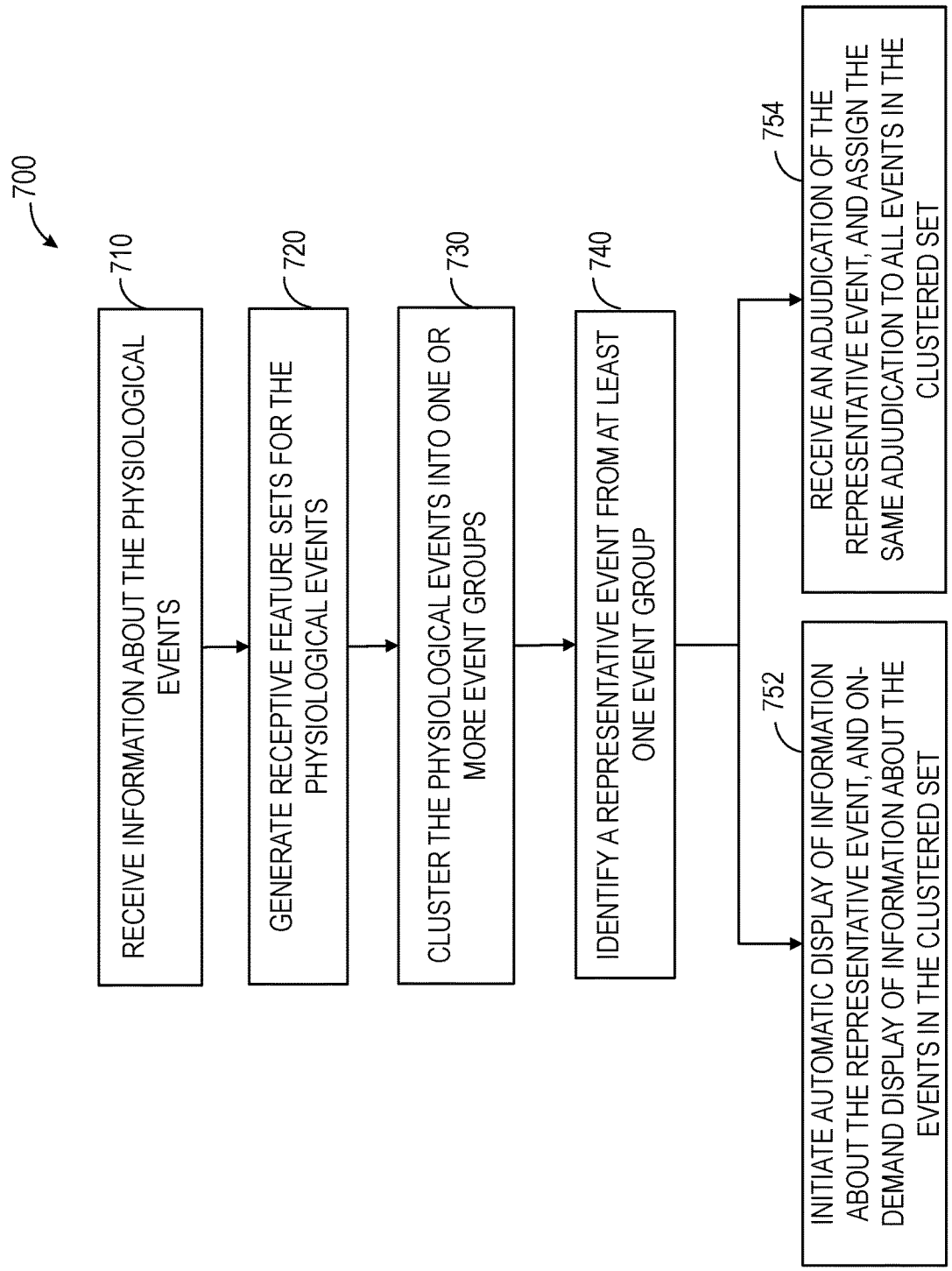
FIG. 7 is a flowchart illustrating an example of a method for managing presentation and adjudication of physiological events detected by a medical device in a patient.

FIG. 7 is a flowchart illustrating an example of a method 700 for managing presentation and adjudication of physiological events detected by a medical device in a patient. The physiological events may include, for example, cardiac arrhythmia episodes detected and recorded by the IMD 102 or the WMD 103. The method 700 may be implemented in and executed by an ambulatory medical device such as an implantable or wearable device, or in a remote patient management system. In an example, the method 700 may be implemented in and executed by the IMD 102, the WMD 103, or the external system 105.

At 710, information about physiological events detected from a patient can be received, such as from the memory circuit 210 that stores patient physiologic event episodes detected by the IMD 102 or the WMD 103. The cardiac arrhythmia episodes may include respective physiologic data sensed from one or more physiologic sensors during the detected arrhythmia event, or additional physiologic data sensed before and/or after the detected arrhythmia event. The physiologic data associated with an arrhythmia episode may include cardiac electrical signals such as one or more ECG or EGM signals. In some examples, the physiological events may include patient-triggered episodes.

At 720, respective feature sets can be generated from the received information for each of the physiological events, such as using the feature extractor circuit 221. In an example where the received information includes physiological data (e.g., ECGs, EGMs, or other sensor signals) recorded during cardiac arrhythmia episodes, the feature sets can include one or more heart rate distribution features, arrhythmia duration features, morphology features, or temporal features extracted from the arrhythmia episodes.

At 730, the physiological events can be clustered into different event groups based on the feature sets of the physiological events, such as using the clustering circuit 222. As described above with reference to FIG. 2, the extracted features sets can form a feature space S, and each physiological event can be represented as a data point in the feature space S. Clustering can be based on unsupervised learning algorithms, such as k-mean cluster, k-medoids, or a fuzzy C-means clustering algorithms. The received physiological events can then be clustered into one or more clustered event groups each include a respective set of physiological events.

At 740, from each of the clustered event groups, a respective representative event can be identified to represent all the physiological events in the corresponding event group. In an example, the representative event can be identified as a physiological event in the event group closest in distance (e.g., Euclidean distance in the feature space S) to a centroid of the physiological events in that event group, as illustrated in FIG. 4A. In some examples, as an alternative to unsupervised learning-based clustering, the received physiological events may be clustered at 730 in accordance with a user-specified cluster center and a set of clustering rules. For example, a user may designate a physiological event as a cluster center. Similarity metrics (e.g., Euclidean distance in the feature space S) between the user-specified cluster center and each of the physiological events can be determined using respective feature sets. A clustered event group can be established by assigning those physiological events with respective similarity metrics satisfying a similarity criterion, such as respective distances to the user-specified cluster center falling below a similarity threshold, as described above with reference to FIG. 4B. The user-designated physiological event can be identified as the representative event at 740. The similarity threshold can be defined or adjusted by a user such as via the user interface 230. In an example, the user may define a bounded region in the feature space S around the user-designated physiological event. The physiological events with respective graphically represented feature sets falling within the user-defined region belong to the same clustered event group. In an example, the user-defined region can be centered on the user-specified physiological event and with a user-defined radius "r", as shown in FIG. 4B. The radius "r", which represents the similarity threshold to the representative event, can be defined or adjustable by the user. In an example, the user can select from a plurality of pre-defined regions of different sizes or shapes centered on the representative event 422, or from a plurality of pre-determined radii (e.g., "large", "medium", and "small" radii) with respective pre-determined values. Alternatively, the user can select from a plurality of pre-defined regions identified as a "dense cluster" (a small region with densely clustered events in the feature space), a "spare cluster" (a large region with sparsely distributed events in the feature space), or any intermediate density levels (e.g., a medium dense cluster, a medium sparse cluster).

The clustering results, including the representative event and an indication that the representative event represents the set of physiological events in a clustered event group, can be output to a user or a process. For example, at 752, the physiological events in a clustered event group can be displayed in a prioritized order. For example, information about the representative event (e.g., ECG, EGM, or other recorded sensor data) may be automatically displayed on a user interface, while the information about other physiological events in the same event group are hidden from displaying until and unless requested by a user. In an example, the user may be notified about an event group (e.g., of N events) represented by a representative event. The user may be prompted to select a hidden physiological event from the clustered event group for displaying. Responsive to use selection, information about the selected event can be displayed.

At 754, a user adjudication of the displayed physiological event can be received from the user via the user interface. The adjudication may include a user designation of an event type for the physiological event, as illustrated in FIG. 5. In accordance with the prioritized display of the physiological events, adjudication of the physiological events in the same group may also be prioritized. For example, the representative event, which gets automatically displayed, can be adjudicated prior to other physiological events in the event group that are displayed on demand (e.g., selected by the user). In some examples, upon an adjudication of the representative event, the same adjudication of the representative event can be assigned to each of the physiological events in the event group. As such, unless modified otherwise (e.g., by a user), all the physiological events in the event group will by default have the same event type as the adjudicated arrhythmia type of the representative event. The default adjudication may be confirmed, rejected, or modified by the user.

The cluster-based prioritized display and adjudication as discussed in this document can reduce a clinician's workload and improve the efficiency of physiological event review and adjudication. The amount of workload reduction can be directly related to the clustering criteria, such as the similarity threshold, or the size or shape of the user-defined region or the user-defined radius "r" in the feature space, as illustrated in FIGS. 4A-4B. On the other hand, assigning the same adjudication to all the physiological events in the same clustered event group may introduce adjudication error rate. As illustrated in FIG. 6, a small radius "r" would result in less workload reduction and a lower adjudication error rate; conversely, a large radius "r" would result in more workload reduction but a higher adjudication error rate. The similarity threshold, or the radius "r", may be determined or adjusted to meet a user-specified requirement of the amount of workload reduction and/or the error tolerance level, In some examples, an "optimal" similarity threshold or radius "r" can be determined to optimize a performance metric proportional to the amount of workload reduction and inversely proportional to the adjudication error rate.

Figure 8:
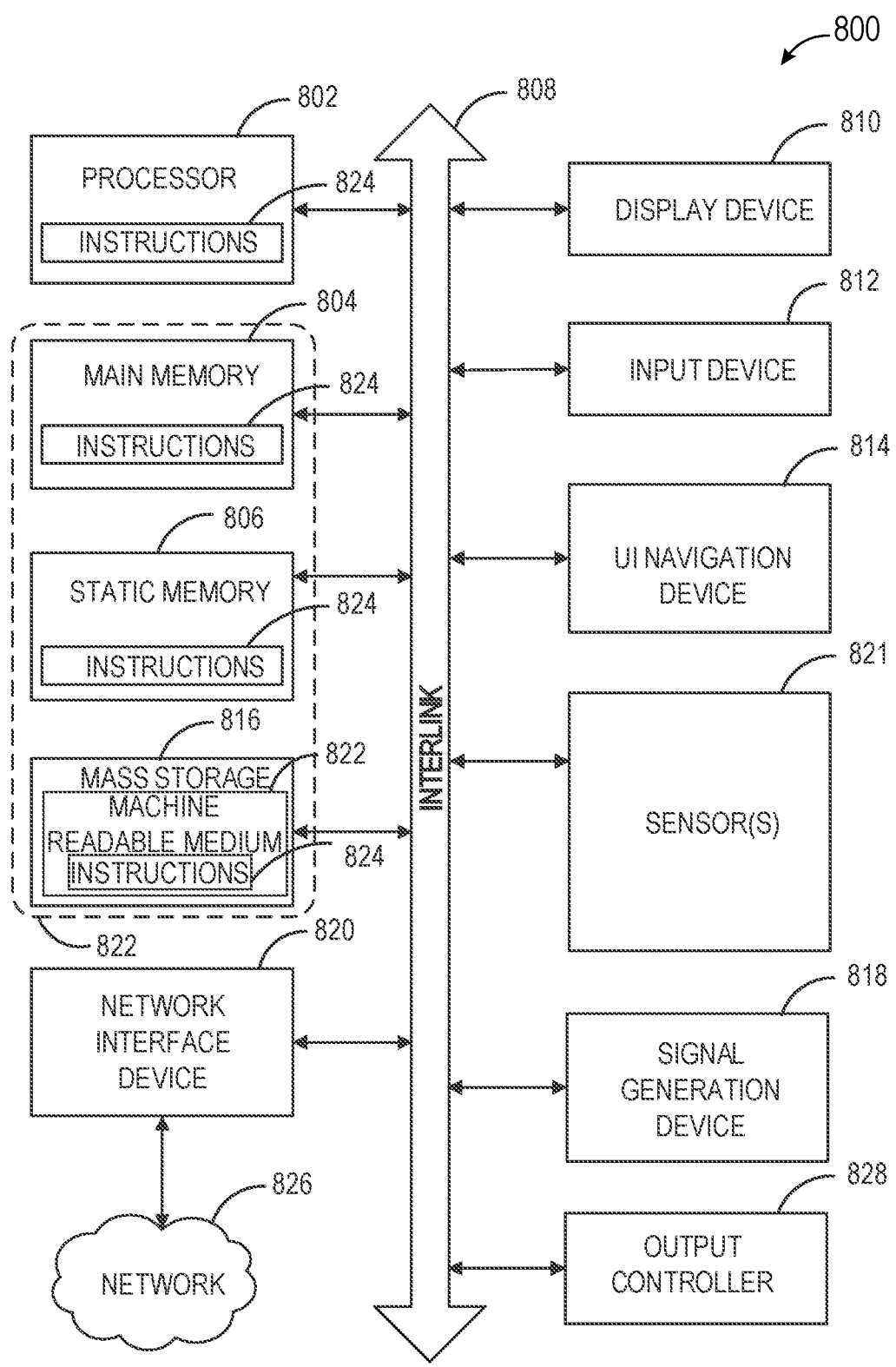
FIG. 8 illustrates generally a block diagram of an example machine upon which any one or more of the techniques (e.g., methodologies) discussed herein may perform.

FIG. 8 illustrates generally a block diagram of an example machine 800 upon which any one or more of the techniques (e.g., methodologies) discussed herein may perform. Portions of this description may apply to the computing framework of various portions of the LCP device, the IMD, or the external programmer.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808.

The machine 800 may further include a display unit 810 (e.g., a raster display, vector display, holographic display, etc.), an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensors. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

The term "machine-readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WiFi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Various embodiments are illustrated in the figures above. One or more features from one or more of these embodiments may be combined to form other embodiments.

The method examples described herein can be machine or computer-implemented at least in part. Some examples may include a computer-readable medium or machine-readable medium encoded with instructions operable to configure an electronic device or system to perform methods as described in the above examples. An implementation of such methods may include code, such as microcode, assembly language code, a higher-level language code, or the like. Such code may include computer readable instructions for performing various methods. The code can form portions of computer program products. Further, the code can be tangibly stored on one or more volatile or non-volatile computer-readable media during execution or at other times.

The above detailed description is intended to be illustrative, and not restrictive. The scope of the disclosure should, therefore, be determined with references to the appended claims, along with the full scope of equivalents to which such claims are entitled.

What is claimed is:

1. A system for managing a plurality of physiological events detected by a medical device in a patient, the system comprising:
   a controller circuit, configured to:
      receive information about the plurality of physiological events;
      for each of the plurality of physiological events, generate a respective feature set using the received information, the feature set including temporal or morphological features with respective values;
      cluster the plurality of physiological events into different event groups using the values of the temporal or morphological features of the generated feature sets, the different event groups each including a respective set of physiological events;
      determine, from at least one of the different event groups, a representative event representing the set of physiological events in the at least one event group; and
      output to a user or a process of the system the representative event and an indication that the representative event has been determined and represents the set of physiological events in the at least one event group, including:
         initiating an automatic display of information about the determined representative event and hiding information about the set of physiological events other than the determined representative event of the at least one event group from displaying automatically on a user interface; and
         in response to a user command via the user interface, initiating an on-demand display of information about one or more of the set of physiological events, other than the determined representative event, of the at least one event group.

2. The system of claim 1, wherein the user command includes a user selection of a physiological event from the set of physiological events of the at least one event group, and wherein the controller circuit is configured to display information about the selected physiological event on the user interface in response to the user selection.

3. The system of claim 1, comprising a user interface configured to receive an adjudication of the representative event from a user,
   wherein the controller circuit is configured to assign the received adjudication of the representative event to each of the set of physiological events of the at least one event group.

4. The system of claim 1, wherein the controller circuit is configured to prioritize storage of information about the determined representative event over storage of information about the set of physiological events of the at least one event group in a storage device.

5. The system of claim 1, wherein the controller circuit is configured to prioritize transmission of information about the determined representative event over transmission of information about the set of physiological events of the at least one event group between different devices.

6. The system of claim 1, wherein the plurality of physiological events include cardiac arrhythmia episodes detected from the patient, and the generated respective feature set includes at least one of:
   a heart rate distribution feature;
   an arrhythmia duration;
   a morphology feature; or
   time of day the plurality of physiological events were detected.

7. The system of claim 1, wherein to determine the representative event, the controller circuit is configured to:
   determine a centroid of the set of physiological events of the at least one event group in a feature space using feature sets generated respectively from at least a portion of the set of physiological events; and
   determine the representative event of the at least one event group as a physiological event closest to the determined centroid.

8. The system of claim 1, wherein to cluster the plurality of physiological events, the controller circuit is configured to:
   initialize a cluster center using a feature set of one of the plurality of physiological events;
   iteratively update the cluster center using a central tendency of feature sets respectively generated from physiological events in an event group until a convergence criterion or an iteration stopping criterion is met; and
   assign a physiological event to a clustered event group based on a similarity metric between the physiological event and the iteratively updated cluster center.

9. The system of claim 1, wherein the controller circuit is configured to:
   compute respective similarity metrics between each of the received plurality of physiological events and a user-specified physiological event using feature sets generated respectively from the received plurality of physiological events and the user-specified physiological event;

determine the set of physiological events of the at least one event group with the respective similarity metrics exceeding a similarity threshold; and determine the user-specified physiological event as the representative event of the least one event group.

10. The system of claim 9, comprising a user interface configured to:

display the received plurality of physiological events in a graphical representation of a feature space;

receive a user input to identify the user-specified physiological event, and a user input of the similarity threshold or a user selection of a pre-determined cluster density; and display information of the user-specified physiological event and an indication that the representative event represents the set of physiological events in the at least one event group.

11. The system of claim 9, wherein the controller circuit is configured to:

generate an estimate of amount of workload reduction, or an estimate of error rate, associated with assigning a user adjudication of the representative event to each of the set of physiological events of the at least one event group; and determine or adjust the similarity threshold based on the generated estimate of amount of workload reduction or the generated estimate of error rate.

12. A method for managing a plurality of physiological events detected by a medical device in a patient, the method comprising:

receiving information about the plurality of physiological events;

for each of the plurality of physiological events, generating a respective feature set using the received information;

clustering the plurality of physiological events into different event groups using the generated feature sets of the plurality of physiological events, the different event groups each including a respective set of physiological events;

determining, from at least one of the different event groups, a representative event representing the set of physiological events in the at least one event group; and outputting to a user or a process the representative event and an indication that the representative event has been determined and represents the set of physiological events in the at least one event group, including:

initiating an automatic display of information about the determined representative event and hiding information about the set of physiological events other than the determined representative event of the at least one event group from displaying automatically on a user interface; and in response to a user command via the user interface, initiating an on-demand display of information about one or more of the set of physiological events, other than the determined representative event, of the at least one event group.

13. The method of claim 12, comprising:

receiving an adjudication of the representative event from a user via the user interface; and automatically assigning the received adjudication of the representative event to each of the set of physiological events of the at least one event group.

14. The method of claim 12, comprising prioritizing storage or transmission of information about the determined representative event over storage or transmission of information about the set of physiological events of the at least one event group.

15. The method of claim 12, wherein clustering the plurality of physiological events into different event groups includes:

initializing a cluster center using a feature set of one of the plurality of physiological events;

iteratively updating the cluster center using a central tendency of feature sets respectively generated from physiological events in an event group until a convergence criterion or an iteration stopping criterion is met; and assigning a physiological event to a clustered event group based on a similarity metric between the physiological event and the iteratively updated cluster center.

16. The method of claim 12, wherein clustering the plurality of physiological events into different event groups includes:

computing respective similarity metrics between each of the received plurality of physiological events and a user-specified physiological event using feature sets generated respectively from the received plurality of physiological events and the user-specified physiological event;

determining the set of physiological events of the at least one event group with the respective similarity metrics exceeding a similarity threshold; and identifying the user-specified physiological event as the representative event of the least one event group.

17. The method of claim 16, comprising, via a user interface:

displaying the received plurality of physiological events in a graphical representation of a feature space;

receiving the user-specified physiological event, and a user input of the similarity threshold or a user selection of a pre-determined cluster density; and displaying information of the user-specified physiological event and an indication that the representative event represents the set of physiological events in the at least one event group.

18. The method of claim 16, comprising:

generating an estimate of amount of workload reduction, or an estimate of error rate, associated with assigning a user adjudication of the representative event to each of the set of physiological events of the at least one event group; and determining or adjusting the similarity threshold based on the generated estimate of amount of workload reduction or the generated estimate of error rate.

* * * * *